(12) United States Patent
Park et al.

(10) Patent No.: US 12,485,718 B1
(45) Date of Patent: Dec. 2, 2025

(54) SUSPENSION APPARATUS

(71) Applicant: HYUNDAI MOBIS CO., LTD., Seoul (KR)

(72) Inventors: Hye Chan Park, Yongin-si (KR); Hyun Jin Woo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/009,243

(22) Filed: Jan. 3, 2025

(30) Foreign Application Priority Data

May 31, 2024 (KR) .................. 10-2024-0071661
Jun. 11, 2024 (KR) .................. 10-2024-0075630

(51) Int. Cl.
*B60G 21/05* (2006.01)
*B60G 7/00* (2006.01)
*B60G 9/02* (2006.01)
*B60G 11/14* (2006.01)

(52) U.S. Cl.
CPC .......... *B60G 21/051* (2013.01); *B60G 7/001* (2013.01); *B60G 9/02* (2013.01); *B60G 11/14* (2013.01); *B60G 2200/21* (2013.01); *B60G 2202/12* (2013.01); *B60G 2204/41* (2013.01); *B60G 2800/162* (2013.01)

(58) Field of Classification Search
CPC ........ B60G 21/051; B60G 7/001; B60G 9/02; B60G 11/14; B60G 2200/21; B60G 2202/12; B60G 2204/41; B60G 2800/162; B60G 21/052; B60G 2200/22
See application file for complete search history.

(56) References Cited

U.S. PATENT DOCUMENTS

| | | | | |
|---|---|---|---|---|
| 4,750,757 A * | 6/1988 | Long | .................. | B60G 21/0551 248/74.2 |
| 5,324,073 A * | 6/1994 | Alatalo | ................ | B60G 21/051 301/124.1 |
| 6,935,646 B2 * | 8/2005 | Inoue | ..................... | B60G 7/008 301/132 |
| 7,284,765 B1 * | 10/2007 | Inoue | ................... | B60G 21/051 280/124.166 |
| 7,556,272 B2 * | 7/2009 | Marchel | ............... | B60G 21/051 280/124.128 |
| 7,651,106 B2 * | 1/2010 | Vortmeyer | ............... | B60G 7/02 280/124.106 |
| 7,891,674 B2 * | 2/2011 | Vaxelaire | ............... | B60G 7/001 280/86.758 |
| 7,946,600 B2 * | 5/2011 | Kobayashi | ............. | B60G 13/16 280/124.108 |

(Continued)

FOREIGN PATENT DOCUMENTS

KR   10-2022-0162460 A   12/2022

*Primary Examiner* — Timothy Wilhelm
(74) *Attorney, Agent, or Firm* — Morgan, Lewis & Bockius LLP

(57) ABSTRACT

The suspension apparatus includes a carrier connected to a wheel, a spring mounted between the carrier and a vehicle body, a torsion beam axle spaced apart from the carrier and connected to the vehicle body, a first support member extending from the carrier, a second support member extending from the torsion beam axle and disposed to face the first support member, and a connection member disposed between the first support member and the second support member and connecting the first support member and the second support member to each other.

16 Claims, 20 Drawing Sheets

(56) References Cited

U.S. PATENT DOCUMENTS

| | | | | |
|---|---|---|---|---|
| 8,210,508 B2* | 7/2012 | Hwang | ................. | F16F 1/3732 |
| | | | | 267/153 |
| 8,220,808 B2* | 7/2012 | Kim | ................... | B60G 21/051 |
| | | | | 180/62 |
| 8,348,290 B2* | 1/2013 | Mildner | ............... | B60G 21/052 |
| | | | | 280/124.109 |
| 8,490,990 B2* | 7/2013 | Lepre | ...................... | B21K 1/12 |
| | | | | 267/273 |
| 8,511,697 B2* | 8/2013 | Ohletz | ............... | B60G 17/0162 |
| | | | | 280/124.13 |
| 9,375,992 B2* | 6/2016 | Lee | ...................... | B60G 21/052 |
| 9,421,838 B2* | 8/2016 | Morino | ................ | B60G 7/001 |
| 9,421,844 B2* | 8/2016 | Carlitz | ................ | B60G 21/051 |
| 9,463,676 B2* | 10/2016 | Yamamotoya | ......... | B60B 15/06 |
| 9,604,531 B2* | 3/2017 | Tamura | .................... | B60G 9/02 |
| 10,202,014 B2* | 2/2019 | Womack | ............ | B60B 35/004 |
| 10,232,758 B1* | 3/2019 | Davis | ................ | B60G 17/0521 |
| 10,442,268 B2* | 10/2019 | Katkar | ................ | B60G 21/051 |
| 10,471,793 B2* | 11/2019 | Kueppers | ............ | B60G 21/051 |
| 10,486,486 B2* | 11/2019 | Auger | ................ | B60G 21/051 |
| 10,549,597 B2* | 2/2020 | Langworthy | ......... | B60B 35/006 |
| 10,632,808 B2* | 4/2020 | Holtheide | .............. | B60G 7/008 |
| 11,084,351 B2* | 8/2021 | Takahashi | .............. | B60G 7/001 |
| 11,827,067 B1* | 11/2023 | Jung | ................ | B60G 21/051 |
| 11,999,215 B2* | 6/2024 | Hirai | ................ | B60G 7/001 |
| 12,134,297 B2* | 11/2024 | Hirai | ................ | B60G 21/051 |
| 12,246,573 B2* | 3/2025 | Woo | ................... | B60G 21/052 |
| 2004/0256828 A1* | 12/2004 | Han | .................... | B60G 21/051 |
| | | | | 280/124.106 |
| 2006/0091721 A1* | 5/2006 | Han | ....................... | B60G 7/008 |
| | | | | 301/132 |
| 2006/0220339 A1* | 10/2006 | Kusaka | .................. | B60B 35/02 |
| | | | | 280/124.128 |
| 2008/0191443 A1* | 8/2008 | Gabbianelli | ......... | B60G 21/051 |
| | | | | 29/428 |
| 2010/0065998 A1* | 3/2010 | Tomida | ................. | F16F 1/3863 |
| | | | | 267/293 |
| 2010/0098483 A1* | 4/2010 | Toepker | ............... | B60G 21/051 |
| | | | | 219/121.64 |
| 2011/0121533 A1* | 5/2011 | Lee | ........................ | B60G 3/202 |
| | | | | 280/124.128 |
| 2011/0248465 A1* | 10/2011 | Carlitz | .................... | B60G 9/00 |
| | | | | 280/124.164 |
| 2012/0211961 A1* | 8/2012 | Zhang | .................. | B60G 21/051 |
| | | | | 301/124.1 |
| 2014/0125025 A1* | 5/2014 | Lee | ...................... | B60G 21/051 |
| | | | | 280/124.1 |
| 2014/0159334 A1* | 6/2014 | Jang | ...................... | B60G 21/051 |
| | | | | 280/124.166 |
| 2014/0174610 A1* | 6/2014 | Edahiro | ................... | C21D 9/08 |
| | | | | 148/400 |
| 2016/0068035 A1* | 3/2016 | Rao | ....................... | B60G 21/051 |
| | | | | 156/60 |
| 2018/0272827 A1* | 9/2018 | Langworthy | ........... | B21D 7/14 |
| 2023/0339277 A1* | 10/2023 | Kim | ....................... | B60G 21/052 |
| 2024/0075786 A1* | 3/2024 | Hirai | .................... | B60G 21/052 |

* cited by examiner

SUSPENSION APPARATUS

CROSS-REFERENCE TO RELATED APPLICATION

This application claims priority from and the benefit of Korean Patent Application No. 10-2024-0071661, filed on May 31, 2024 and No. 10-2024-0075630, filed on Jun. 11, 2024, which is hereby incorporated by reference for all purposes as if set forth herein.

BACKGROUND

Field

Exemplary embodiments of the present disclosure relate to a suspension apparatus, and more particularly, to a rear wheel suspension apparatus of an electric vehicle.

Discussion of the Background

In general, a suspension of a vehicle is an apparatus that connects an axle and a vehicle body to substantially prevent vibration or shock applied from a road surface during traveling from being directly transferred to the vehicle body, thereby substantially preventing damage to the vehicle body or cargo and improving riding comfort.

Recently, eco-friendly vehicles such as electric vehicles have been increasingly developed, and in electric vehicles, a suspension apparatus that can secure a space for placing a large-capacity battery in order to increase all-electric range (AER) has been actively developed.

The background art for a suspension apparatus is disclosed in Korean Patent Application Laid-Open No. 10-2022-0162460 (published on Dec. 8, 2022 and entitled "Torsion Beam Axle Apparatus for Vehicle").

SUMMARY

An object of the present disclosure is to provide a suspension apparatus that can reduce a load input to a component and improve space utilization.

An object of the present disclosure is to provide a suspension apparatus that can secure a space for placing a battery.

An object of the present disclosure is to provide a suspension apparatus that can reduce weight and cost.

An object of the present disclosure is to provide a suspension apparatus with improved formability.

In order to solve the above problems, a suspension apparatus in accordance with an aspect of the present disclosure includes: a carrier connected to a wheel; a spring mounted between the carrier and a vehicle body; a torsion beam axle spaced apart from the carrier and connected to the vehicle body; a first support member extending from the carrier; a second support member extending from the torsion beam axle and disposed to face the first support member; and a connection member disposed between the first support member and the second support member and connecting the first support member and the second support member to each other.

The carrier may include: a first carrier body disposed to face the wheel and rotatably supporting the wheel; and a second carrier body extending from the first carrier body in a first direction and supporting the spring.

The torsion beam axle may include: a torsion bar disposed in parallel to a width direction of the vehicle body; and a trailing arm connected to the torsion bar and supporting the torsion bar with respect to the vehicle body.

The torsion bar may be disposed behind a central axis of the wheel.

The connection member may include: a first bush connected to the first support member; a second bush connected to the second support member and disposed to face the first bush; and a pipe disposed between the first bush and the second bush and including both ends connected to the first bush and the second bush, respectively.

The first bush and the second bush may be elastically deformable.

The pipe may be disposed in parallel to the first direction.

The pipe may include: a first pipe extending from the first bush; and a second pipe extending from the second bush and connected to the first pipe to be reciprocally movable in a direction parallel to the first direction.

The second pipe may be rotatably connected to the first pipe centered on the first direction, and may reciprocally move in the direction parallel to the first direction according to a rotational direction.

The connection member may further include: a fastening rod configured to penetrate the first bush, the pipe, and the second bush; a first pressing member connected to one end of the fastening rod and pressing the first bush toward the second bush; and a second pressing member connected to the other end of the fastening rod and pressing the second bush toward the first bush.

A suspension apparatus in accordance with an aspect of the present disclosure includes: a carrier connected to a wheel; a spring mounted between the carrier and a vehicle body; a torsion beam axle spaced apart from the carrier and connected to the vehicle body; a carrier support member extending from the torsion beam axle and including a first carrier support member and a second carrier support member spaced apart from each other; and a connection part connecting the carrier, the first carrier support member, and the second carrier support member to one another.

The carrier may include: a first carrier body connected to the wheel; and a second carrier body extending from the first carrier body and supporting the spring.

The torsion beam axle may include: a torsion bar disposed in parallel to a width direction of the vehicle body; and a trailing arm connected to the torsion bar and supporting the torsion bar with respect to the vehicle body.

The torsion bar may be disposed behind a central axis of the wheel.

The carrier support member may include: a first carrier hole penetrating the first carrier support member; a first carrier bush mounted in the first carrier hole; a second carrier hole penetrating the second carrier support member; and a second carrier bush mounted in the second carrier hole.

The first carrier body may be disposed between the first carrier bush and the second carrier bush.

The connection part may include: a connector connecting the first carrier bush, the second carrier bush, and the first carrier body to one another; and a pressing member fastened to the connector and pressing the first carrier bush and the second carrier bush toward the first carrier body.

The first carrier bush and the second carrier bush may be elastically deformable.

The carrier may include a carrier shock absorber connection member disposed on the second carrier body, and the suspension apparatus may further include a shock absorber connected to the carrier shock absorber connection member and the vehicle body to attenuate shock transmitted from the wheel.

The carrier may include a carrier link arm connection member disposed on the second carrier body, and the suspension apparatus may further include a link arm connected to the carrier link arm connection member and the vehicle body to limit a movement path of the carrier.

The first carrier body may be disposed to face the wheel and may rotatably support the wheel The carrier may include a seating groove disposed in the second carrier body to support the spring; and a spring fixing member disposed in the seating groove to prevent the spring from being detached.

The torsion beam axle may include a trailing arm hole penetrating the trailing arm; and a trailing arm bush disposed in the trailing arm hole, and the trailing arm bush may be connected to the vehicle body.

The carrier may include a first carrier body hole penetrating the first carrier body.

The carrier may include a first carrier body bush disposed in the first carrier body hole, and the connector may penetrate the first carrier body bush.

In accordance with an embodiment of the present disclosure, a rotational force transmitted from a carrier to a pipe when a wheel bumps can be offset by elastic deformation of a first bush and a second bush spaced apart from each other based on the center of the pipe, and the rotation of the carrier can be substantially prevented.

In accordance with an embodiment of the present disclosure, as a first bush and a second bush are connected to each other by a pipe separated from a first support member and a second support member, the magnitude of a load applied to a carrier and a torsion beam axle when a wheel bumps can be reduced, and the durability performance of a component can be improved.

In accordance with an embodiment of the present disclosure, as a first support member and a second support member are not directly connected to each other, the thicknesses of the first support member and the second support member parallel to a first direction can be reduced, so that the overall weight of a product can be reduced and space utilization can be improved.

In accordance with an embodiment of the present disclosure, compared to when a first support member and a second support member are directly connected to each other, a gap between a first bush and a second bush can be increased, thereby reducing the magnitude of a load applied to the first bush and the second bush.

In accordance with an embodiment of the present disclosure, when there is a concern that a first support member and a second support member may interfere with adjacent components, a packaging space can be secured by reducing a distance between a first bush and a second bush by adjusting the length of a pipe.

In accordance with an embodiment of the present disclosure, when a load applied from a road surface is expected to increase depending on driving conditions of a vehicle, the magnitude of a reaction moment generated by a first bush and a second bush can be increased by increasing a distance between the first bush and the second bush by adjusting the length of a pipe, thereby reducing the magnitude of a load applied to the first bush and the second bush.

In accordance with an embodiment of the present disclosure, a space where a battery is placed can be secured, and durability against a high load can be improved.

In accordance with an embodiment of the present disclosure, weight and cost can be reduced, and formability can be improved.

DETAILED DESCRIPTION OF THE ILLUSTRATED EMBODIMENTS

Figure 1:
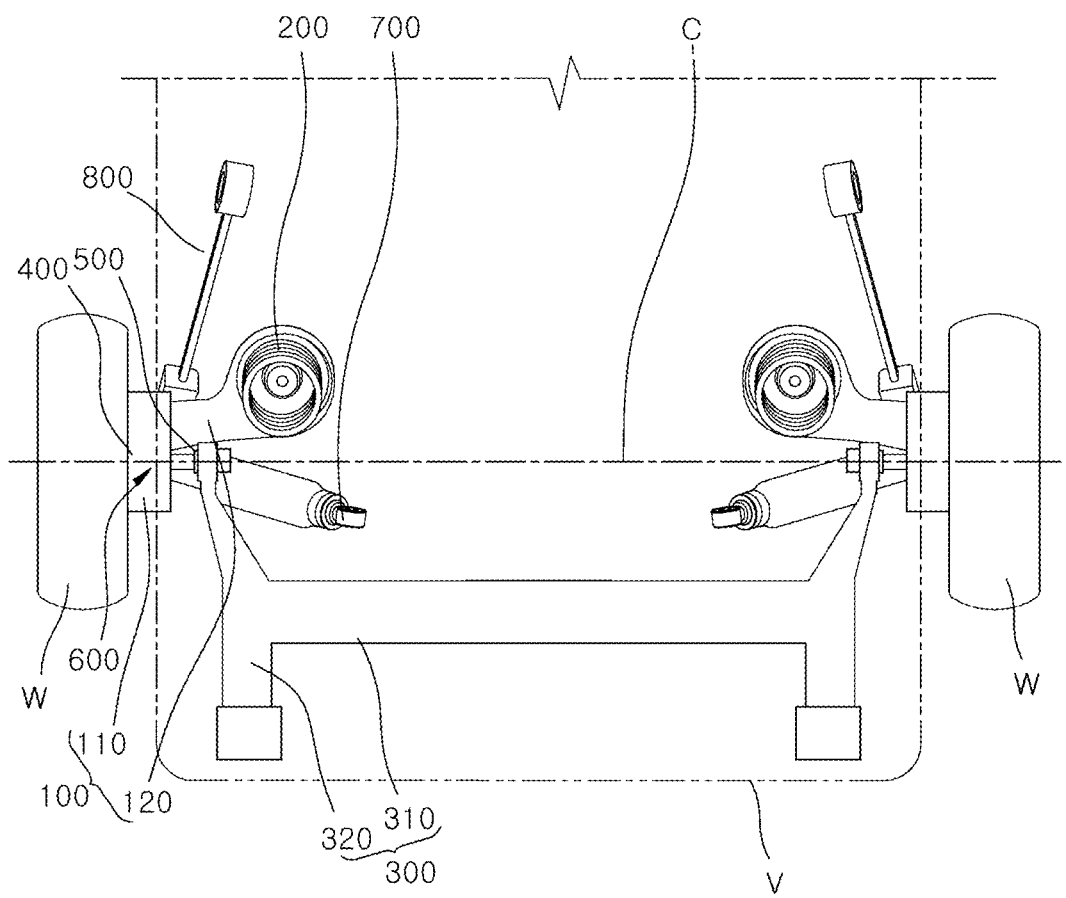
FIG. 1 is a diagram schematically illustrating an installation state of a suspension apparatus in accordance with an embodiment of the present disclosure.

Hereinafter, embodiments of the present disclosure are described with reference to the accompanying drawings.

In this process, the thicknesses of lines or the sizes of elements illustrated in the drawings may be exaggerated for the purpose of clarity and convenience of explanation. Furthermore, terms to be described below are terms defined in consideration of functions thereof in the present disclosure and may be changed according to the intention of a user or an operator, or practice. Accordingly, such terms should be defined based on the disclosure over the present specification.

Furthermore, in the present specification, when a certain part is referred to as being "connected (or coupled) to" another part, it may indicate that the former part is directly connected (or coupled) to the latter part or indirectly connected (or coupled) to the latter part with another part interposed therebetween. In the present specification, when a certain part "includes (or comprises)" a certain component, it means that the part does not exclude another component but may further "include (or comprise)" another component, unless referred to the contrary.

Furthermore, the same reference numerals may refer to the same components throughout the present specification. Even though the same reference numerals or similar reference numerals are not mentioned or described in a specific drawing, the reference numerals may be described based on other drawings. Furthermore, even though there is a portion which is not indicated by reference numerals in a specific drawing, the portion may be described based on other drawings. Furthermore, the number, shapes, and sizes of detailed components included in the drawings of the present application and relative differences in the sizes are set for convenience of understanding, and do not limit embodiments and may be implemented in various forms.

Figure 2:
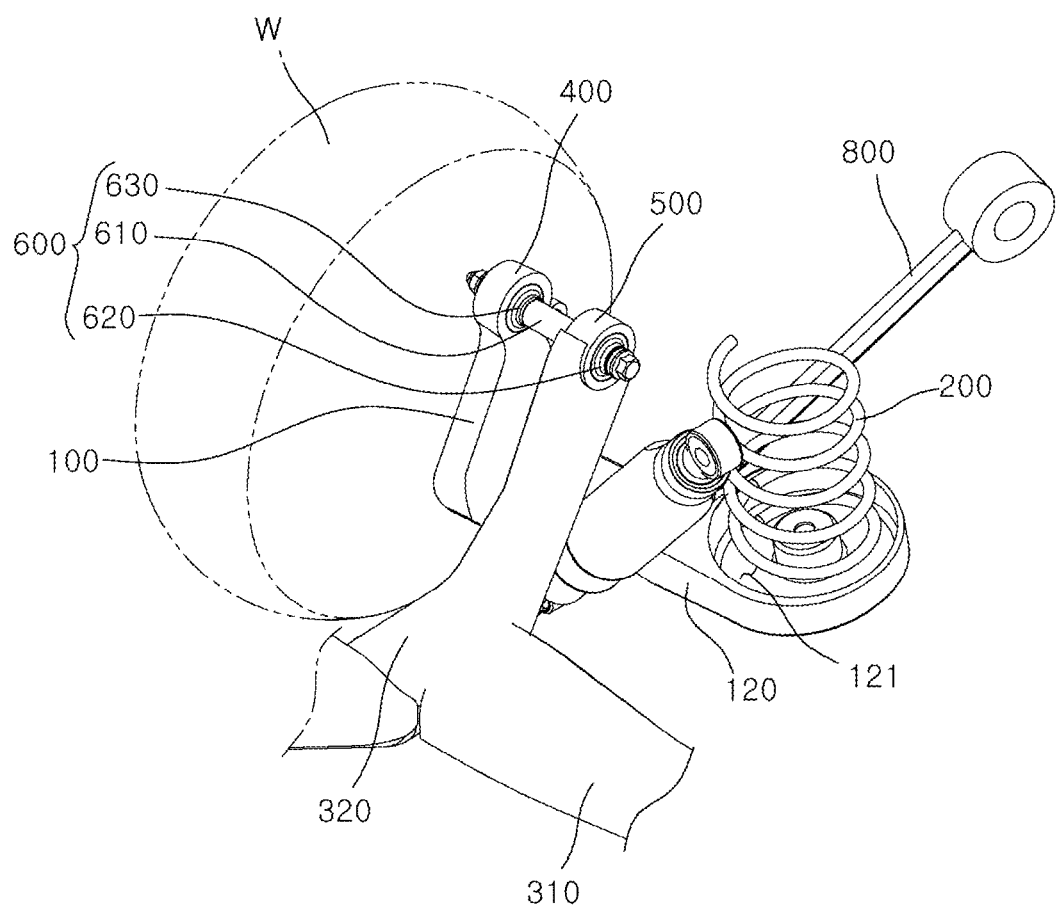
FIG. 2 is a perspective view schematically illustrating the configuration of the suspension apparatus in accordance with an embodiment of the present disclosure.
Figure 3:
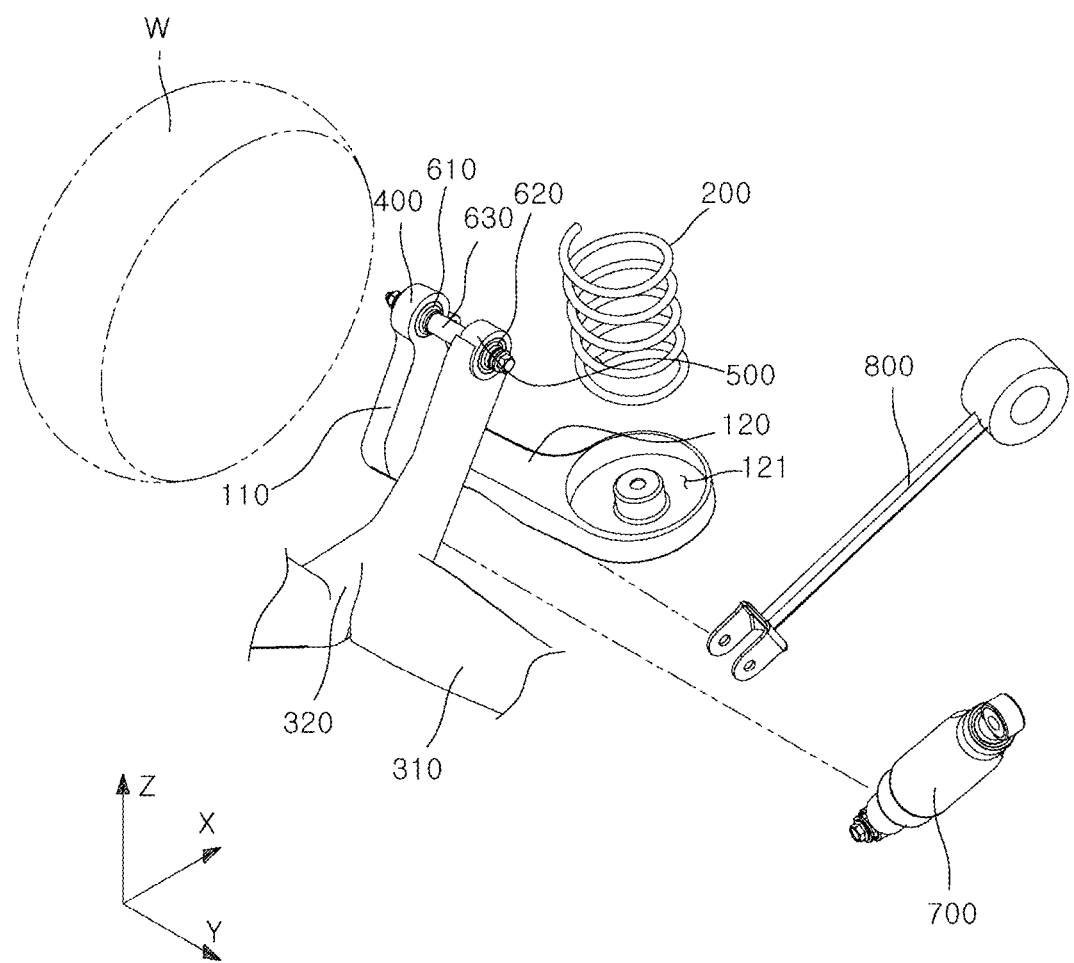
FIG. 3 is an exploded perspective view schematically illustrating the configuration of the suspension apparatus in accordance with an embodiment of the present disclosure.

FIG. 1 is a diagram schematically illustrating an installation state of a suspension apparatus in accordance with an embodiment of the present disclosure, FIG. 2 is a perspective view schematically illustrating the configuration of the suspension apparatus in accordance with an embodiment of the present disclosure, and FIG. 3 is an exploded perspective view schematically illustrating the configuration of the suspension apparatus in accordance with an embodiment of the present disclosure.

Referring to FIGS. 1 and 2, the suspension apparatus in accordance with an embodiment of the present disclosure includes a carrier 100, a spring 200, a torsion beam axle 300, a first support member 400, a second support member 500, and a connection member 600.

A vehicle body V to be described below may refer to various structures forming the structural skeleton of a vehicle, such as a frame body, a subframe, and a body shell. The following describes an example in which the longitudinal direction of the vehicle body V refers to a direction parallel to an X-axis based on FIG. 1 and the width direction of the vehicle body V refers to a direction parallel to a Y-axis based on FIG. 2.

A wheel W to be described below may refer to a rear wheel of the vehicle. A central axis of the wheel W may be disposed in parallel to the width direction of the vehicle body V.

The carrier 100 may be connected to the wheel W rotatably installed on a lower side of the vehicle body V. The carrier 100 may serve as a configuration of providing the mechanical connection of various suspension components such as the spring 200 and the torsion beam axle 300 to be described below between the vehicle body V and the wheel W.

The carrier 100 may be provided as a pair. A pair of carriers 100 may be individually connected to a pair of wheels W disposed to face each other along the width direction of the vehicle body V.

The carrier 100 in accordance with the present embodiment may include a first carrier body 110 and a second carrier body 120.

The first carrier body 110 may form the external appearance of one side of the carrier 100 and may rotatably support the wheel W.

The first carrier body 110 in accordance with the present embodiment may be disposed to face the wheel W along the width direction of the vehicle body V. The first carrier body 110 may be spaced apart from an inner surface of the wheel W by a predetermined distance along the width direction of the vehicle body V. The inner surface of the wheel W may refer to a surface where a pair of wheels W spaced apart along the width direction of the vehicle body V face each other. The first carrier body 110 may be connected to the wheel W by a wheel bearing B. The first carrier body 110 may rotatably support the wheel W around a central axis C of the wheel W. The specific shape of the first carrier body 110 is not limited to the shape illustrated in FIGS. 2 and 3, and the first carrier body 110 may be designed to have various shapes.

The second carrier body 120 forms the external appearance of the other side of the carrier 100 and may support the spring 200 to be described below.

The second carrier body 120 in accordance with the present embodiment may extend from the first carrier body 110 in a first direction. The following describes an example in which the first direction is a direction parallel to the width direction of the vehicle body V, that is, a direction from the first carrier body 110 toward a center line A of the vehicle body V. However, the first direction is not limited thereto, and may also be a direction inclined at a predetermined angle with respect to the width direction of the vehicle body V. The specific shape of the second carrier body 120 is not limited to the shape illustrated in FIGS. 2 and 3, and the second carrier body 120 may be designed to have various shapes.

The second carrier body 120 may include a seating groove 121 in which the spring 200 to be described below is seated.

The seating groove 121 in accordance with the present embodiment may be formed to have a shape of a groove that is concavely recessed downward from an upper surface of the second carrier body 120. The seating groove 121 may be disposed at an end of the second carrier body 120. The seating groove 121 may have an approximately circular cross-section.

The spring 200 may be disposed between the carrier 100 and the vehicle body V. The spring 200 may be elastically deformable. The spring 200 may serve as a configuration of generating a load in a direction opposite to the movement of the wheel W by elastic deformation when the wheel W bumps, thereby maintaining the grounding state of the wheel W and absorbing shock input from the road surface. The spring 200 in accordance with the present embodiment may be formed to have a shape of a coil spring that is stretchable in the longitudinal direction. A lower part of the spring 200 may be inserted into the seating groove 121 and fixed to a bottom surface of the seating groove 121. An upper part of the spring 200 may be fixed to the vehicle body V. The longitudinal direction of the spring 200 may be vertical with respect to the ground. However, the spring 200 is not limited thereto, and may also be inclined at a predetermined angle with respect to the ground within a range in which an elastic restoring force directed downward when the wheel W bumps may be generated.

The torsion beam axle 300 may be spaced apart from the carrier 100 and connected to the vehicle body V. The torsion beam axle 300 may be connected to the carrier 100 via the first support member 400, the second support member 500, and the connection member 600 to be described below.

The torsion beam axle 300 in accordance with the present embodiment may include a torsion bar 310 and a trailing arm 320.

The torsion bar 310 may form the external appearance of a central part the torsion beam axle 300 and may be arranged apart from the carrier 100. The torsion bar 310 may serve as a configuration of absorbing pitching occurring in the vehicle body V during traveling of the vehicle through its own torsional deformation and improving roll stiffness when the vehicle is turning, thereby securing turning stability.

The torsion bar 310 in accordance with the present embodiment may be formed to have a shape of a bar disposed in parallel to the width direction of the vehicle body V. A length of the torsion bar 310 may be smaller than a gap between the pair of wheels W.

The torsion bar 310 may be disposed behind the central axis C of the wheel W. That is, the torsion bar 310 may be disposed at a position spaced rearward from the central axis C of the wheel W by a predetermined distance along the longitudinal direction of the vehicle body V. Accordingly, the torsion bar 310 may further improve the packaging efficiency of a battery (not illustrated) by expanding a space where the battery is installed below the vehicle body V. The specific shape of the torsion bar 310 is not limited to the shape illustrated in FIGS. 2 and 3, and the torsion bar 310 may be designed to have various shapes.

The trailing arm 320 may be connected to the torsion bar 310 and may support the torsion bar 310 with respect to the vehicle body V.

The trailing arm 320 in accordance with the present embodiment may be connected to an end of the torsion bar 310. The trailing arm 320 may be fixed to the end of the torsion bar 310 by various types of coupling methods such as welding and bolting. An end of the trailing arm 320 may be extended rearward from the torsion bar 310 and connected to the vehicle body V. The end of the trailing arm 320 may be rotatably connected to the vehicle body V to absorb displacement occurring when the wheel W bumps or rebounds. For example, the end of the trailing arm 320 may be rotatably connected to the vehicle body V by a bush, a bearing, a ball joint, or the like.

The trailing arm 320 may be provided as a pair. The pair of trailing arms 320 may be spaced apart from each other along the width direction of the vehicle body V. The pair of trailing arms 320 may be connected to both ends of the torsion bar 310, respectively.

The first support member 400 may extend from the carrier 100. The first support member 400 may serve as a configuration of providing a connection structure between the connection member 600 to be described below and the carrier 100.

The first support member 400 in accordance with the present embodiment may be formed to have a shape of a cantilever extending upward from the first carrier body 110. The first support member 400 may be disposed between the wheel W and the spring 200.

The second support member 500 may extend from the torsion beam axle 300 and may be disposed to face the first support member 400. The second support member 500 may serve as a configuration of providing a connection structure between the connection member 600 to be described below and the torsion beam axle 300.

The second support member 500 in accordance with the present embodiment may be formed to have a shape of a cantilever extending from the trailing arm 320. The second support member 500 may be disposed to face the first support member 400 along the first direction. The first support member 400 and the second support member 500 may be spaced apart from each other by a predetermined distance along the first direction. Accordingly, the first support member 400 and the second support member 500 may align the longitudinal direction of the connection member 600 to be described below in a direction parallel to the first direction. The second support member 500 may be disposed between the wheel W and the spring 200, more specifically, between the first support member 400 and the spring 200.

The connection member 600 may be provided between the first support member 400 and the second support member 500. The connection member 600 may serve as a configuration of connecting the first support member 400 and the second support member 500 to each other and offsetting a moment generated between the first support member 400 and the second support member 500 when the wheel W bumps.

Figure 4:
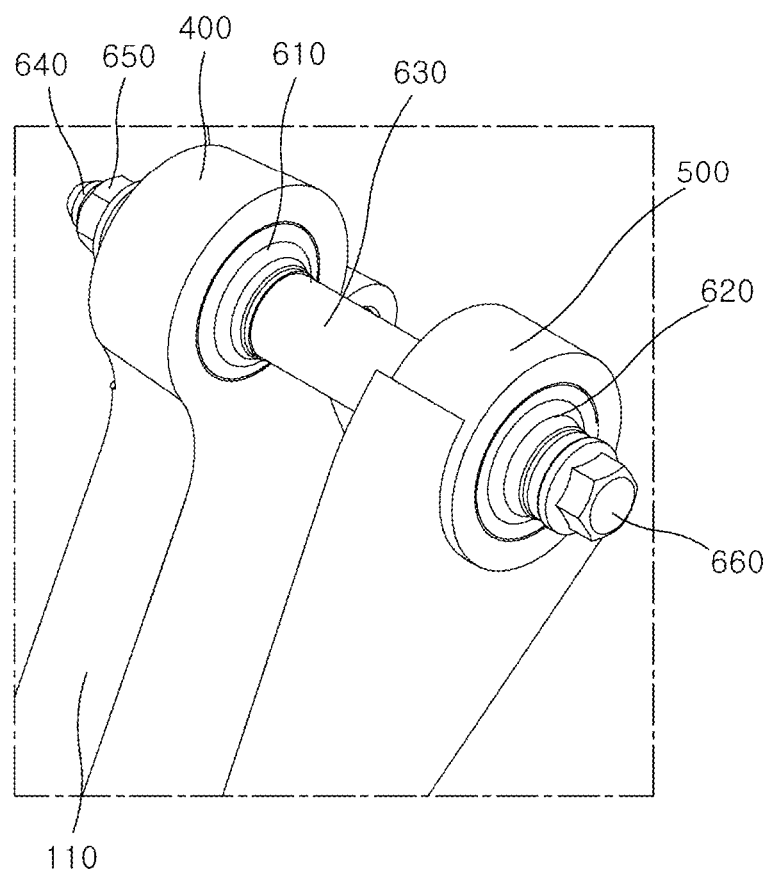
FIG. 4 is an enlarged view schematically illustrating the configuration of a connection member in accordance with an embodiment of the present disclosure.
Figure 5:
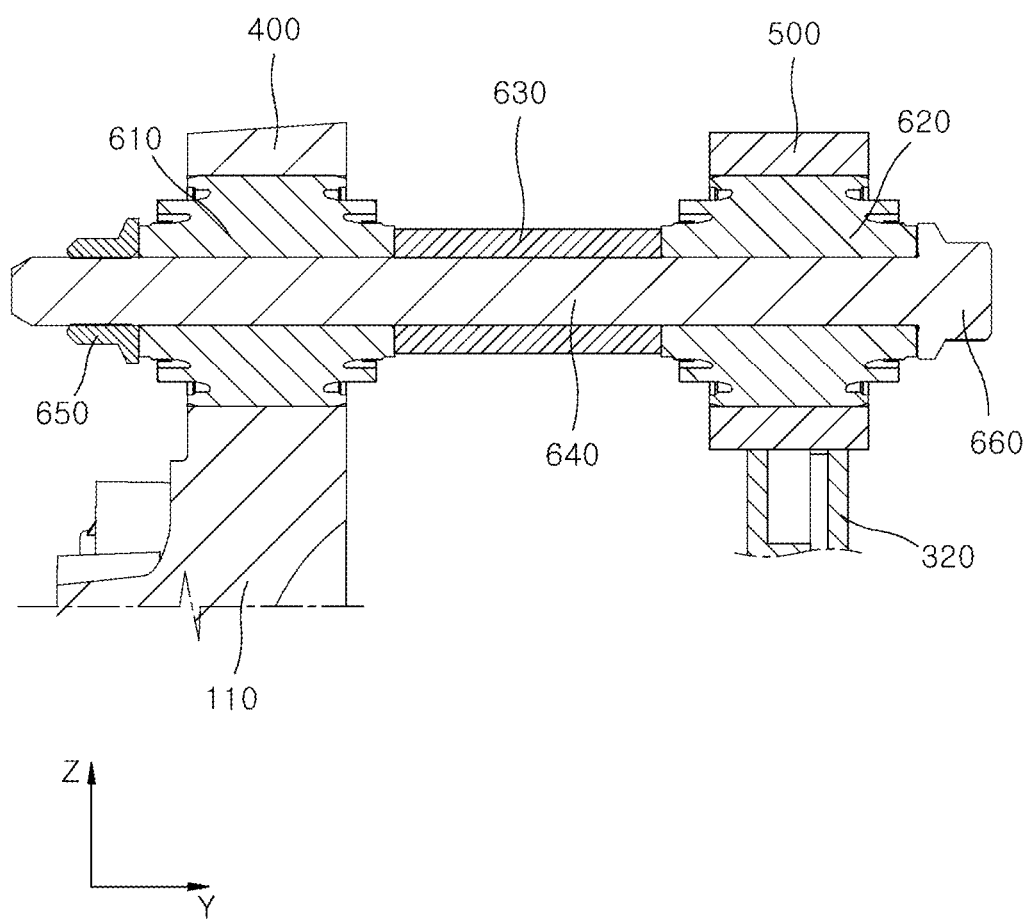
FIG. 5 is a cross-sectional view schematically illustrating the configuration of the connection member in accordance with an embodiment of the present disclosure.
Figure 6:
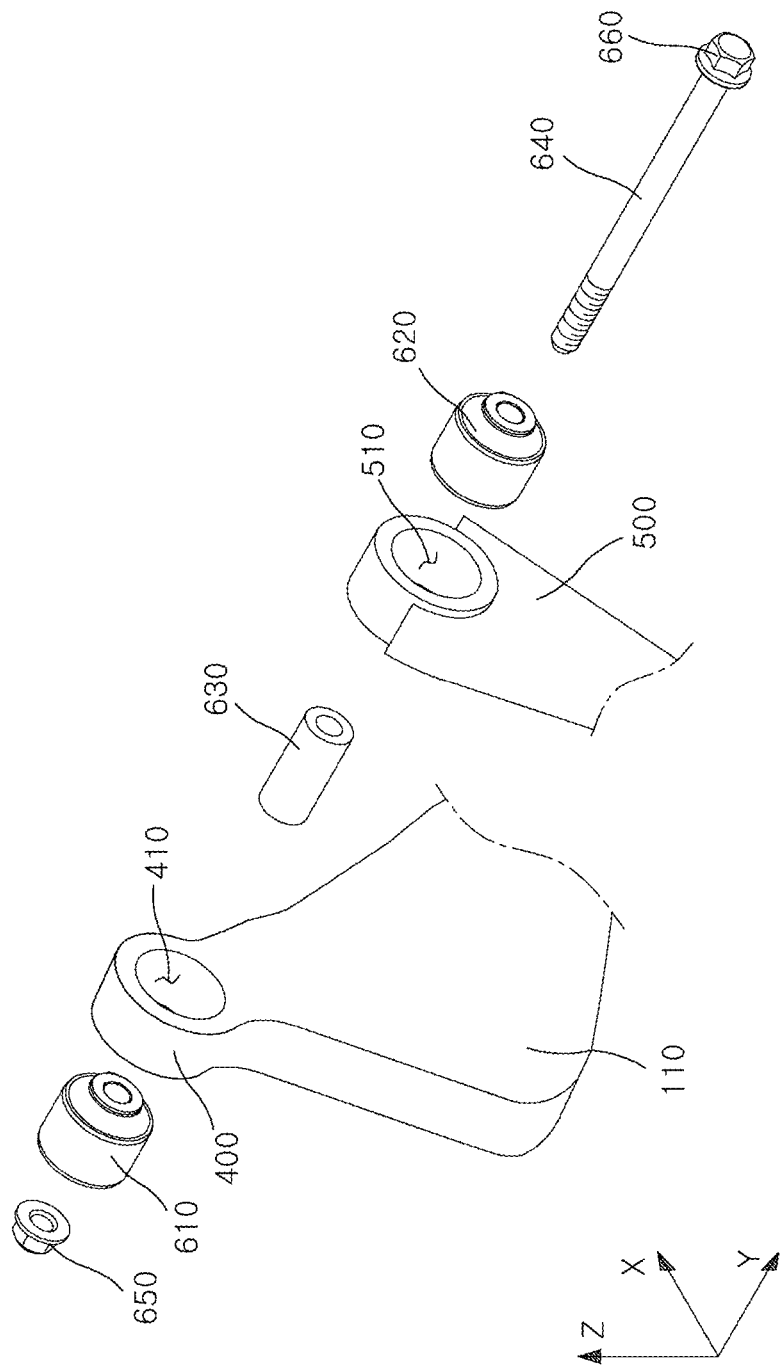
FIG. 6 is an exploded perspective view schematically illustrating the configuration of the connection member in accordance with an embodiment of the present disclosure.

FIG. 4 is an enlarged view schematically illustrating the configuration of the connection member in accordance with an embodiment of the present disclosure, FIG. 5 is a cross-sectional view schematically illustrating the configuration of the connection member in accordance with an embodiment of the present disclosure, and FIG. 6 is an exploded perspective view schematically illustrating the configuration of the connection member in accordance with an embodiment of the present disclosure.

Referring to FIGS. 1 to 6, the connection member 600 in accordance with the present embodiment may include a first bush 610, a second bush 620, and a pipe 630.

The first bush 610 may be connected to the first support member 400. The first bush 610 may be elastically deformable. The first bush 610 may be elastically deformed when the wheel W bumps and may generate a reaction force that offsets a load applied to the carrier 100 from the wheel W.

The first bush 610 in accordance with the present embodiment may be formed to have various types of bushes including an inner body and an outer body in a shape of a ring disposed to form a concentric circle, and an elastic body disposed between the inner body and the outer body.

The first support member 400 may include a first insertion hole 410 into which the first bush 610 is inserted. The first insertion hole 410 in accordance with the present embodiment may be formed to have a shape of a hole penetrating both sides of the first support member 400 along the first direction. The first insertion hole 410 may be disposed at an upper end of the first support member 400.

The first bush 610 may be inserted into the first insertion hole 410, and an outer peripheral surface of the first bush 610 may be fixed to an inner peripheral surface of the first insertion hole 410. A central axis of the first bush 610 may be disposed in parallel to the first direction.

The second bush 620 may be connected to the second support member 500 and may be disposed to face the first bush 610. The second bush 620 may be elastically deformable. The second bush 620 may be elastically deformed when the wheel W bumps and may generate a reaction force that offsets a load applied from the spring 200 to the carrier 100.

The second bush 620 in accordance with the present embodiment may be formed to have various types of bush shapes including an inner body and an outer body in the shape of a ring that are arranged to form a concentric circle, and an elastic body arranged between the inner body and the outer body.

The second support member 500 may include a second insertion hole 510 into which the second bush 620 is inserted. The second insertion hole 510 in accordance with the present embodiment may be formed to have a shape of a hole that penetrates both sides of the second support member 500 along the first direction. The second insertion hole 510 may be disposed at the upper end of the first support member 400. A central axis of the second insertion hole 510 may be disposed to be coaxial with a central axis of the first insertion hole 410.

The second bush 620 may be inserted into the second insertion hole 510, and an outer peripheral surface of the second bush 620 may be pressed and fixed to an inner peripheral surface of the second insertion hole 510. A central axis of the second bush 620 may be disposed in parallel to the first direction, and may be disposed to be coaxial with the central axis of the first bush 610.

The pipe 630 may be disposed between the first bush 610 and the second bush 620.

The pipe 630 in accordance with the present embodiment may be formed to have a shape of a tube with an empty interior and open both ends. Both ends of the pipe 630 may be connected to the first bush 610 and the second bush 620, respectively. Accordingly, the pipe 630 may serve as a moment arm that transmits a rotational force generated in the carrier 100 when the wheel W bumps to the first bush 610 and the second bush 620 to induce elastic deformation of the first bush 610 and the second bush 620, and transmits a reaction moment generated from the first bush 610 and the second bush 620 to the carrier 100.

The pipe 630 may be disposed so that its longitudinal direction is parallel to the first direction. Accordingly, the pipe 630 may induce a reaction moment generated by the elastic deformation of the first bush 610 and the second bush 620 when the wheel W bumps to act in a direction in which the direction of a moment generated in the carrier 100 by the wheel W and the spring 200 is offset.

As the first bush 610 and the second bush 620 are connected to each other by the pipe 630 separated from the first support member 400 and the second support member 500, the magnitude of a load applied to the carrier 100 and the torsion beam axle 300 when the wheel W bumps can be reduced, and the durability performance of the component can be improved. In addition, as the first bush 610 and the second bush 620 are connected to each other by the pipe 630 separated from the first support member 400 and the second support member 500, the thickness of the first support member 400 and the second support member 500 parallel to the first direction can be reduced and the overall weight of the product can be reduced and the space utilization can be improved. In addition, compared to when the first support member 400 and the second support member 500 are directly connected to each other, a gap between the first bush 610 and the second bush 620 can be increased, so that the magnitude of a load applied to the first bush 610 and the second bush 620 can be reduced.

Both ends of the pipe 630 may communicate with hollows of the first bush 610 and the second bush 620.

The connection member 600 in accordance with the present embodiment may further include a fastening rod 640, a first pressing member 650, and a second pressing member 660.

The fastening rod 640 may penetrate the first bush 610, the pipe 630, and the second bush 620.

The fastening rod 640 in accordance with the present embodiment may be formed to have a shape of a bolt screw having threads formed on the outer peripheral surface thereof. The fastening rod 640 may be disposed so that its longitudinal direction is parallel to the first direction. The fastening rod 640 may be inserted to sequentially penetrate the first bush 610, the pipe 630 through the hollow of the first bush 610 or the second bush 620, and the second bush 620. In such a case, both ends of the fastening rod 640 may protrude outwardly from the first bush 610 and the second bush 620, respectively.

The first pressing member 650 may be connected to one end of the fastening rod 640 and may press the first bush 610 toward the second bush 620.

The first pressing member 650 in accordance with the present embodiment may be connected to one end of the fastening rod 640 that protrudes outwardly from the first bush 610. For example, the first pressing member 650 is formed to have a shape of a hollow nut screw formed on the inner peripheral surface thereof with threads, and may be screw-coupled with the outer peripheral surface of one end of the fastening rod 640. The first pressing member 650 may reciprocally move along the longitudinal direction of the fastening rod 640 according to the rotational direction, and a gap with the first bush 610 may be adjusted. As the first pressing member 650 moves toward the first bush 610 by a set distance or more, the inner surface of the first pressing member 650 may come into contact with the outer surface of the first bush 610 so that the first pressing member 650 may press the first bush 610 toward the second bush 620.

The second pressing member 660 may be connected to the other end of the fastening rod 640 and may press the second bush 620 toward the first bush 610.

The second pressing member 660 in accordance with the present embodiment may be connected to the other end of the fastening rod 640 protruding outwardly from the second bush 620. For example, the second pressing member 660 may be formed to have a shape of a bolt head integrally connected to the other end of the fastening rod 640. As the fastening rod 640 is completely inserted into the first bush 610, the pipe 630, and the second bush 620, the inner surface of the second pressing member 660 may come into contact with the outer surface of the second bush 620, so that the second pressing member 660 may press the second bush 620 toward the first bush 610. Accordingly, the first pressing member 650 may constantly maintain a gap with the first support member 400 and the second pressing member 660 may constantly maintain a gap with the second support member 500, thereby substantially preventing the first bush 610 and the second bush 620 from being detached from the first support member 400 and the second support member 500, respectively.

In the above, an example in which the first pressing member 650 has the form of a nut screw and the second pressing member 660 has the form of a bolt head has been described; however, the first pressing member 650 and the second pressing member 660 are not limited thereto and it is also possible for the first pressing member 650 to have the form of a bolt head and for the second pressing member 660 to have the form of a nut screw.

The suspension apparatus in accordance with the present embodiment may further include a shock absorber 700 and a link arm 800.

The shock absorber 700 may be connected to the carrier 100 to attenuate the magnitude of vibration or shock transmitted from the road surface to the wheel W. The shock absorber 700 in accordance with the present embodiment may be exemplified by various types of shock absorbers 700 that are filled with gas, oil, or the like and may generate a damping force by an expansion motion. A lower part of the shock absorber 700 may be connected to the first carrier body 110 or the second carrier body 120 by a ball joint, a bush, or the like. An upper part of the shock absorber 700 may be connected to the vehicle body V by a ball joint, a bush, or the like.

The link arm 800 may be connected to the carrier 100 and may support the carrier 100 with respect to the vehicle body V. The link arm 800 may serve as a configuration of providing an additional support force to the carrier 100 separately from the trailing arm 320.

The link arm 800 in accordance with the present embodiment may be formed to have shapes of various types of suspension links. A lower part of the link arm 800 may be connected to the first carrier body 110 or the second carrier body 120 by a ball joint, a bush, or the like. The upper part of the link arm 800 may be connected to the vehicle body V by a ball joint, a bush, etc. An upper part of the link arm 800 may be placed in front of the central axis of the wheel W. That is, the trailing arm 320 and the link arm 800 may be spaced back and forth along the longitudinal direction of the vehicle body V based on the central axis of the wheel W.

An operation process of the suspension apparatus in accordance with an embodiment of the present disclosure is described below.

Figure 7:
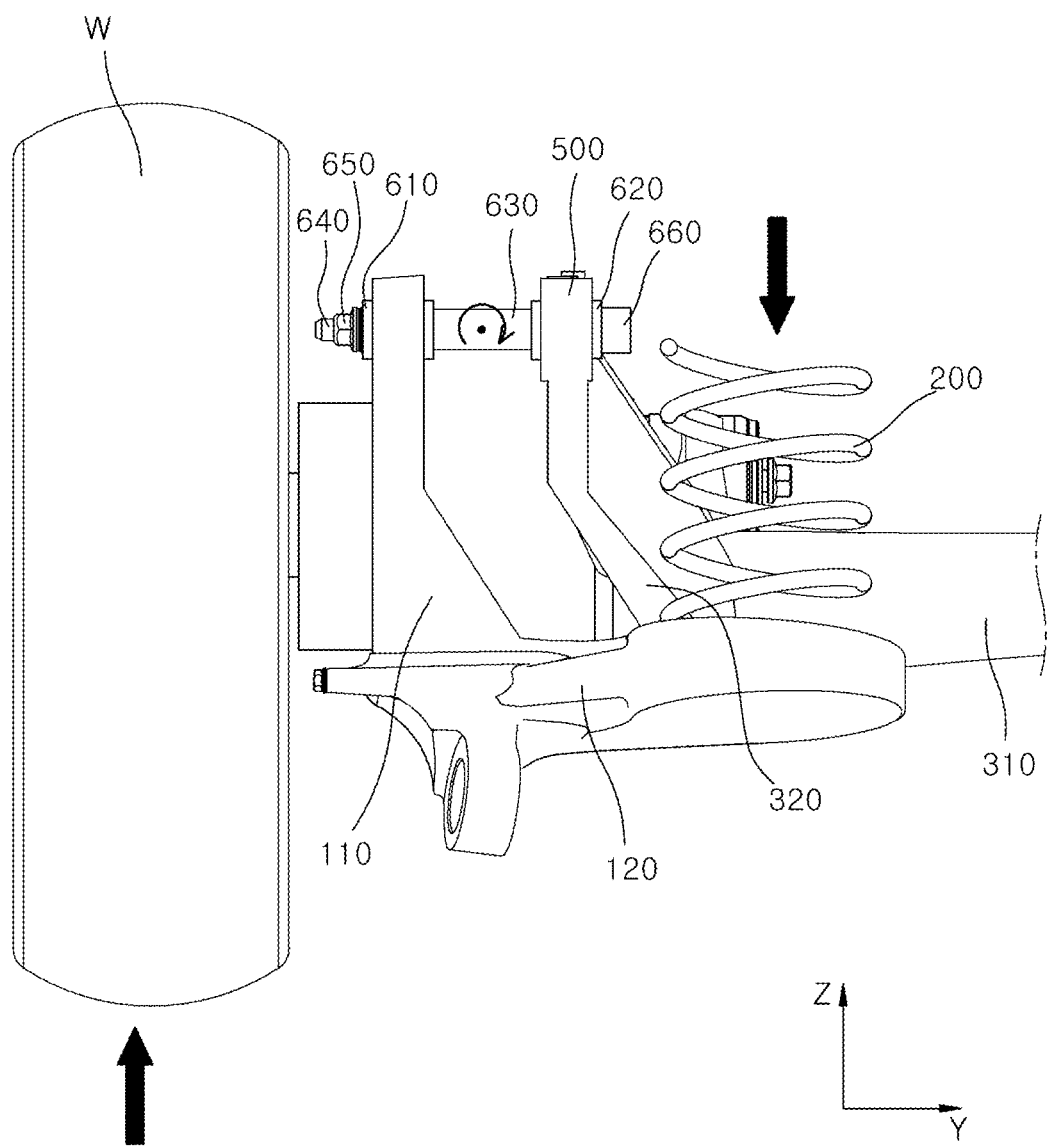
FIGS. 7 and 8 are diagrams schematically illustrating the operation process of the suspension apparatus in accordance with an embodiment of the present disclosure.
Figure 8:
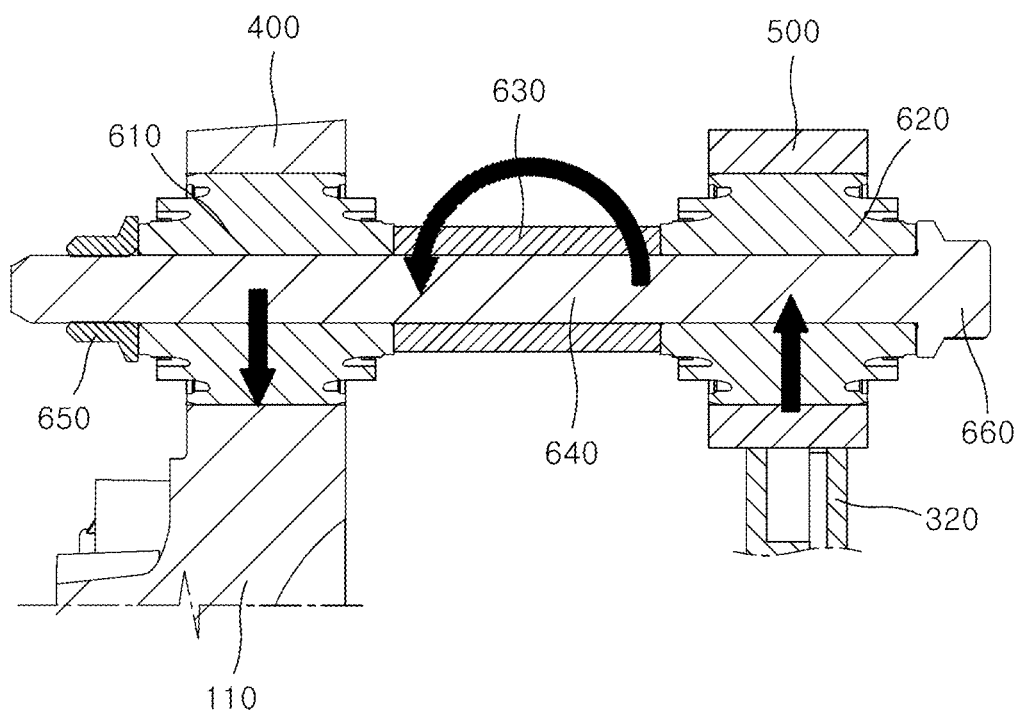

FIGS. 7 and 8 are diagrams schematically illustrating the operation process of the suspension apparatus in accordance with an embodiment of the present disclosure.

Referring to FIG. 7, while the vehicle is traveling, a load directed upward from the road surface may be applied to the wheel W and the first carrier body 110 due to unevenness or the like of the road surface.

Due to such a load, the spring 200 may be compressed in the longitudinal direction and may apply an elastic force to the second carrier body 120 in the direction toward the road surface.

As a load applied to the first carrier body 110 through the wheel W and a load applied to the second carrier body 120 by the spring 200 act in opposite directions, a rotational force is generated in the carrier 100 centered on a direction intersecting the first direction.

As such a rotational force is transmitted to the connection member 600 through the first support member 400 and the first support member 400 and the second support member 500 are integrally connected to the connection member 600, a moment is generated in the center of the pipe 330 centered on the direction intersecting with the first direction.

Referring to FIG. 8, the first bush 610 and the second bush 620 are elastically deformed by the moment acting on the center of the pipe 330. More specifically, the first bush 610 applies a load directed downward toward the road surface to the first support member 400, and the second bush 620 applies a load directed upward from the road surface to the second support member 500.

Due to the elastic loads of the first bush 610 and the second bush 620, a reaction moment is generated in the center of the pipe 330 to offset the moment generated by the wheel W and the spring 200, and the rotation of the carrier 100 may be substantially prevented.

A suspension apparatus in accordance with another embodiment of the present disclosure is described below.

The suspension apparatus in accordance with the present embodiment may be configured to differ only in the detailed configuration of the pipe 630 from the suspension apparatus in accordance with an embodiment of the present disclosure described based on FIGS. 1 to 8.

Accordingly, in describing the suspension apparatus in accordance with the present embodiment, only the detailed configuration of the pipe 630 that is different from the suspension apparatus in accordance with an embodiment of the present disclosure is described.

The description of the suspension apparatus in accordance with an embodiment of the present disclosure may be applied as is to the remaining configurations of the suspension apparatus in accordance with the present embodiment.

Figure 9:
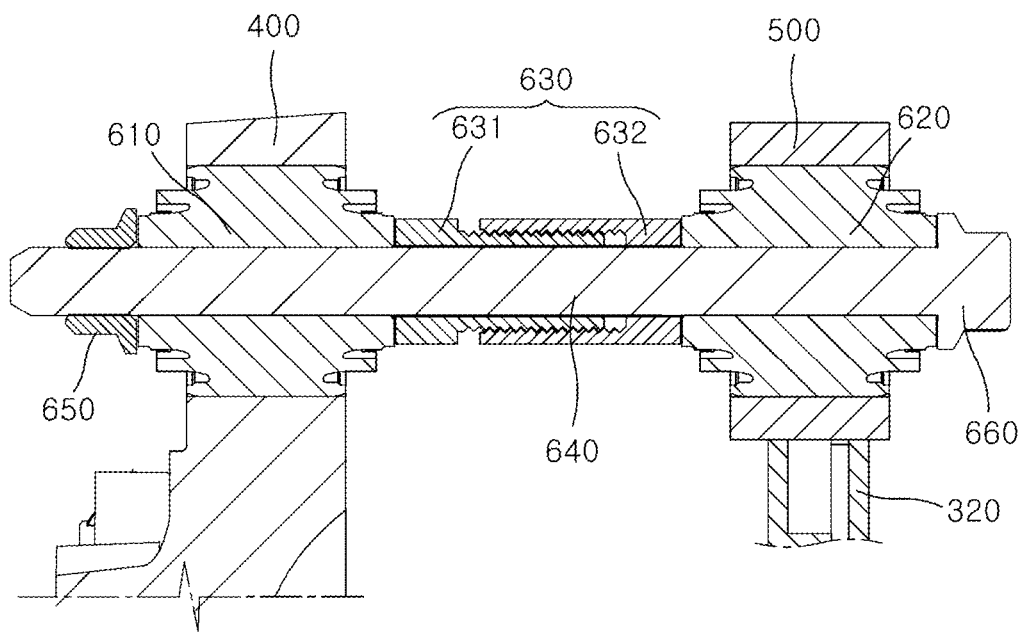
FIG. 9 is a cross-sectional view schematically illustrating the configuration of a pipe in accordance with another embodiment of the present disclosure.
Figure 10:
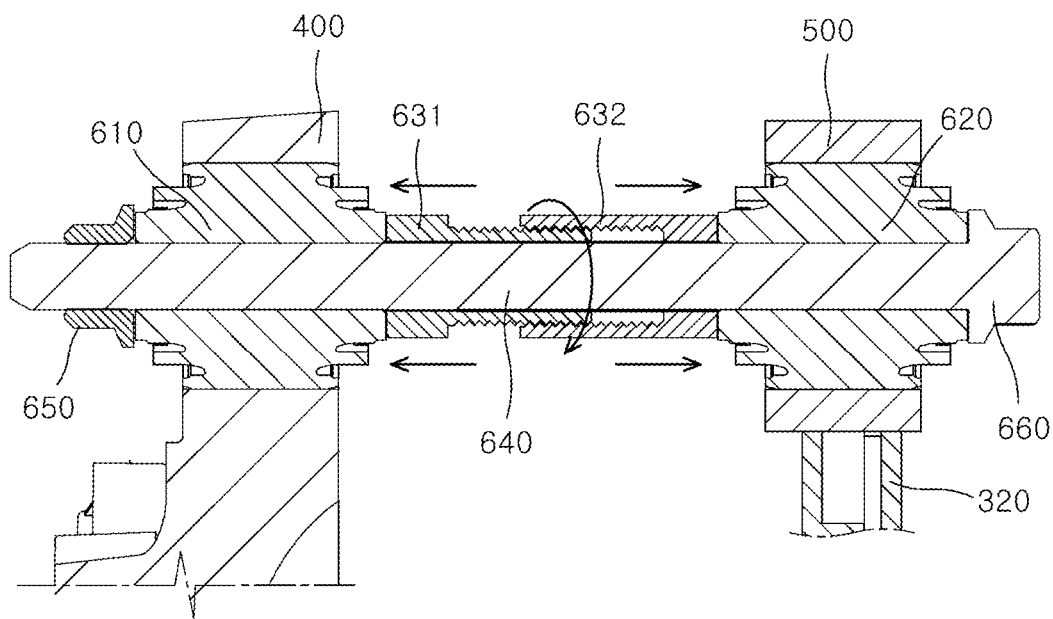
FIGS. 10 and 11 are diagrams schematically illustrating the operation process of the pipe in accordance with another embodiment of the present disclosure.
Figure 11:
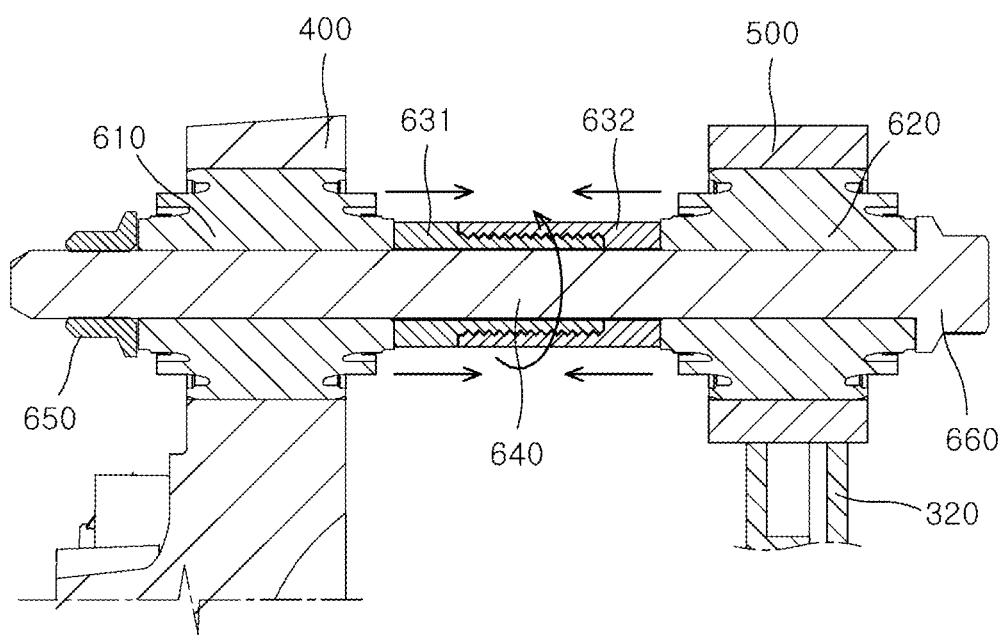

FIG. 9 is a cross-sectional view schematically illustrating the configuration of a pipe in accordance with another embodiment of the present disclosure, and FIGS. 10 and 11 are diagrams schematically illustrating the operation process of the pipe in accordance with another embodiment of the present disclosure.

Referring to FIGS. 9 to 11, the pipe 630 in accordance with the present embodiment may include a first pipe 631 and a second pipe 632.

The first pipe 631 may form the external appearance of one side of the pipe 630 and extend from the first bush 610 toward the second bush 620.

The first pipe 631 in accordance with the present embodiment may have a shape of a tube with an empty interior and open both sides. The first pipe 631 may be disposed so that its longitudinal direction is parallel to the first direction. One end of the first pipe 631 may be fixed to the inner surface of the first bush 610. The other end of the first pipe 631 may be spaced apart from the inner surface of the second bush 620 by a predetermined distance.

The second pipe 632 may form the external appearance of the other side of the pipe 630 and extend from the second bush 620 toward the first bush 610.

The second pipe 632 in accordance with the present embodiment may have a shape of a tube with an empty interior and open both sides. The second pipe 632 may be disposed so that its longitudinal direction is parallel to the first direction. One end of the second pipe 632 may be fixed to the inner surface of the second bush 620. The other end of the second pipe 632 may be spaced apart from the inner surface of the first bush 610 by a predetermined distance.

The second pipe 632 may be connected to the first pipe 631 to be reciprocally movable in a direction parallel to the first direction. Accordingly, the pipe 630 may vary a distance between the first bush 610 and the second bush 620 by a relative movement of the first pipe 631 and the second pipe 632.

For example, the first pipe 631 may be inserted into the second pipe 632. Screw threads may be formed on the outer peripheral surface of the first pipe 631 and the inner peripheral surface of the second pipe 632, and the inner peripheral surface of the second pipe 632 may be screw-coupled into the outer peripheral surface of the first pipe 631. However, the first pipe 631 and the second pipe 632 are not limited thereto, and the outer peripheral surface of the first pipe 631 may be screw-coupled with the inner peripheral surface of the second pipe 632.

In a state in which the second pipe 632 is screw-coupled with the first pipe 631, the second pipe 632 may be rotated clockwise or counterclockwise around the first direction. In such a case, the second pipe 632 can be directly rotatably connected to the second bush 620. However, when the second pipe 632 is integrally connected to the second bush 620 and rotated in a state in which the second bush 620 is not inserted into the second insertion hole 510, the second pipe 632 can also be rotated around the first direction together with the second bush 620.

The second pipe 632 may reciprocally move along the first pipe 631 in a direction parallel to the first direction depending on the rotational direction, and vary the distance between the first bush 610 and the second bush 620.

More specifically, as illustrated in FIG. 10, as the second pipe 632 is rotated in one of a clockwise direction and a counterclockwise direction around the first direction, the second pipe 632 moves in the direction opposite to the first direction toward the first bush 610, so that the distance between the first bush 610 and the second bush 620 may be decreased.

Accordingly, when there is a concern that the first support member 400 and the second support member 500 may interfere with adjacent components, a user can secure a packaging space by reducing the distance between the first bush 610 and the second bush 620.

As illustrated in FIG. 11, as the second pipe 632 is rotated in the other one of the clockwise direction and the counterclockwise direction around the first direction, the second pipe 632 moves in the first direction, so that the distance between the first bush 610 and the second bush 620 may be increased.

Accordingly, when it is expected that a load applied from the road surface will increase depending on traveling conditions of the vehicle, the user can increase the distance between the first bush 610 and the second bush 620, thereby increasing the magnitude of a reaction moment generated by the first bush 610 and the second bush 620 and reducing the magnitude of a load applied to the first bush 610 and the second bush 620.

In the above, an example in which the second pipe 632 is rotatably connected to the first pipe 631 has been described; however, the present disclosure is not limited thereto and the first pipe 631 can also be rotatably connected to the second pipe 632.

A suspension apparatus in accordance with further another embodiment of the present disclosure is described below.

Figure 12:
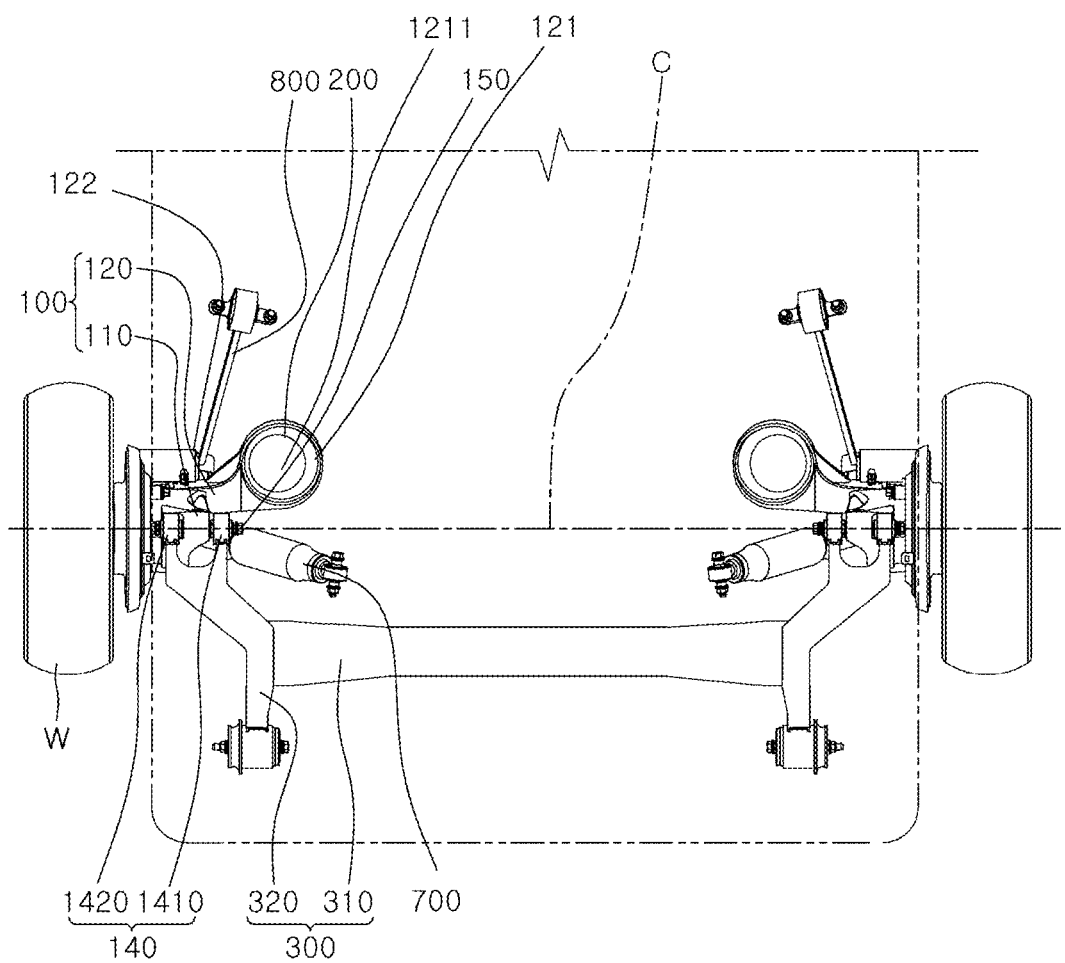
FIG. 12 is a diagram schematically illustrating an installation state of a suspension apparatus in accordance with further another embodiment of the present disclosure.
Figure 13:
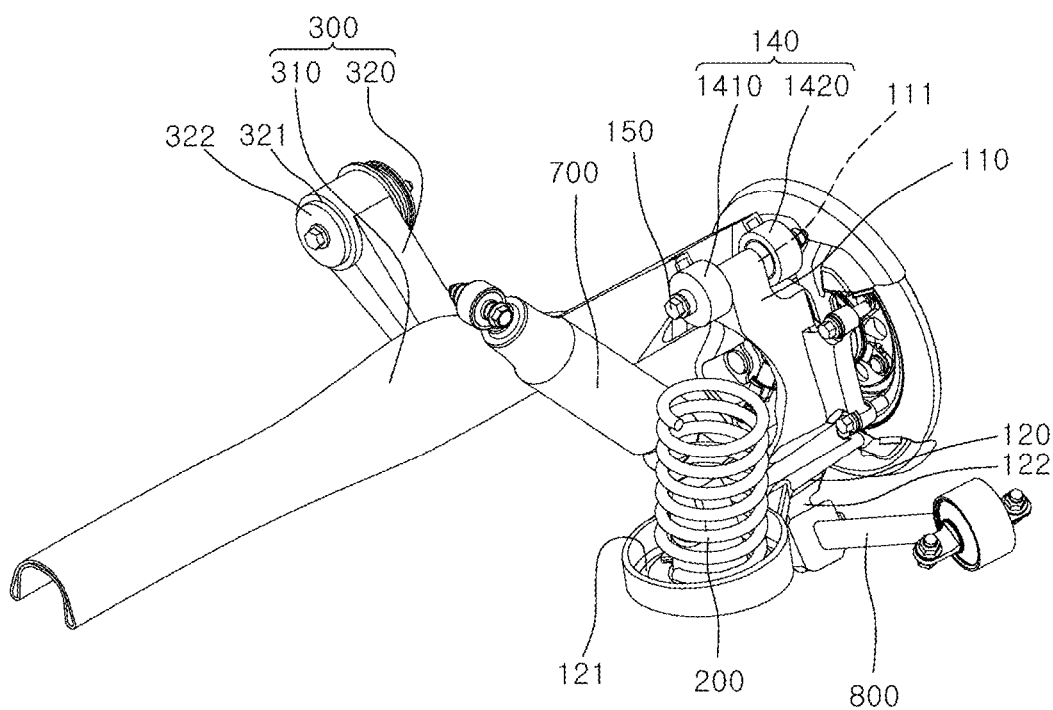
FIG. 13 is a perspective view of the suspension apparatus in accordance with further another embodiment of the present disclosure when viewed from a first viewpoint.
Figure 14:
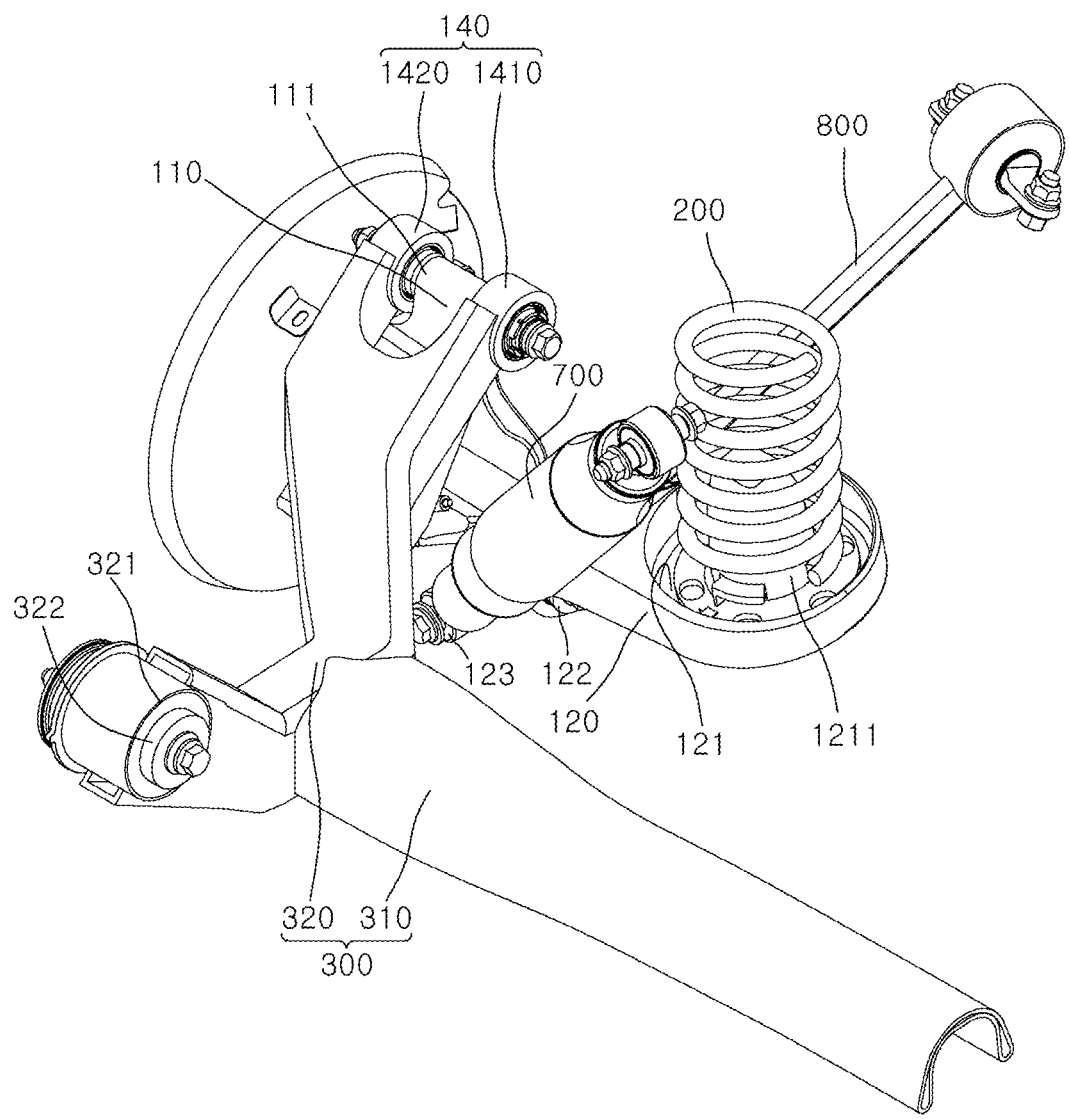
FIG. 14 is a perspective view of the suspension apparatus in accordance with further another embodiment of the present disclosure when viewed from a second viewpoint.
Figure 15:
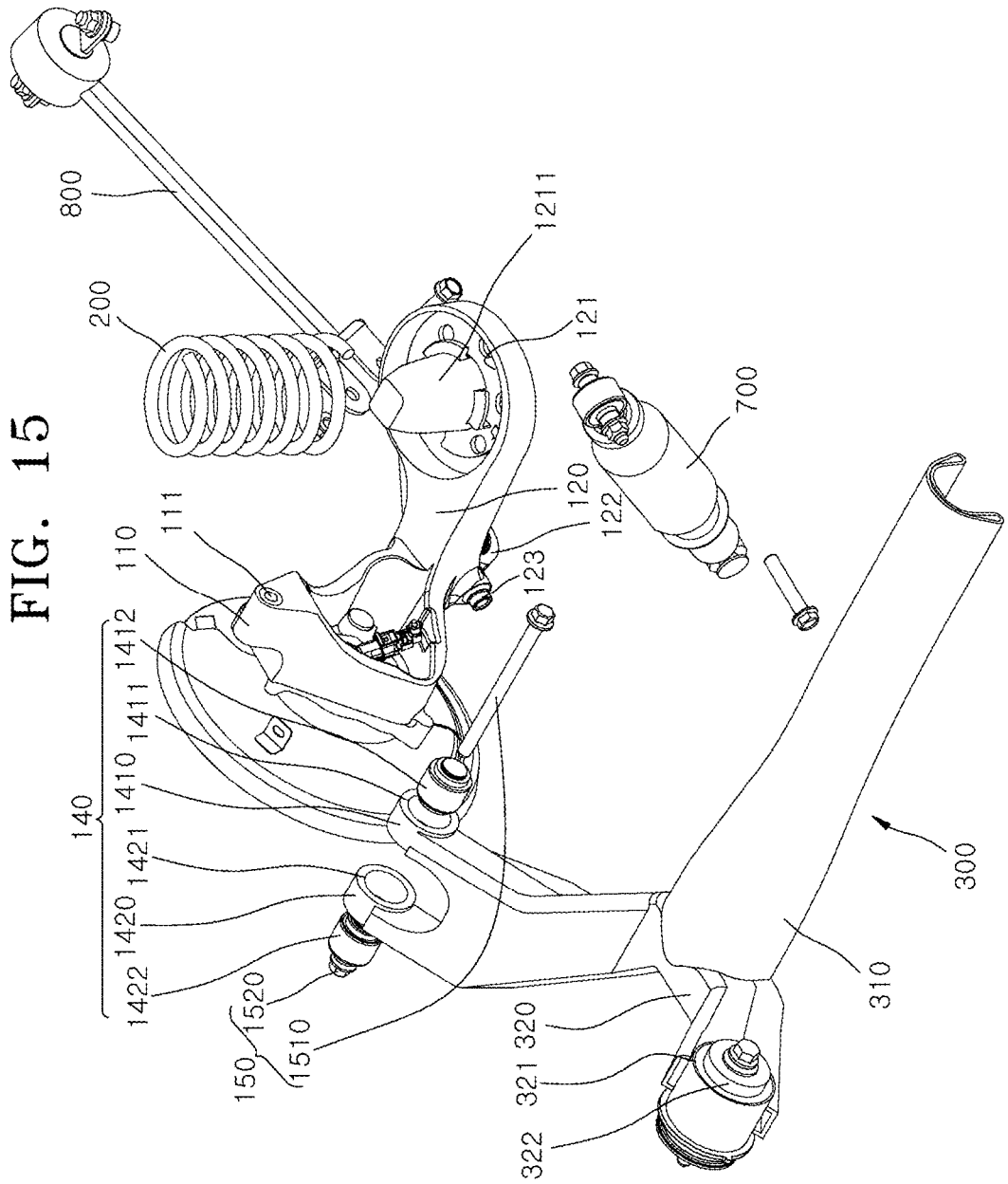
FIG. 15 is an exploded perspective view of the suspension apparatus in accordance with further another embodiment of the present disclosure when viewed from a second viewpoint.

FIG. 12 is a diagram schematically illustrating an installation state of a suspension apparatus in accordance with further another embodiment of the present disclosure, FIG. 13 is a perspective view of the suspension apparatus in accordance with further another embodiment of the present disclosure when viewed from a first viewpoint, FIG. 14 is a perspective view of the suspension apparatus in accordance with further another embodiment of the present disclosure when viewed from a second viewpoint, and FIG. 15 is an exploded perspective view of the suspension apparatus in accordance with further another embodiment of the present disclosure when viewed from a second viewpoint.

Referring to FIGS. 12 to 15, the suspension apparatus may include a carrier 100, a spring 200, a torsion beam axle 300, a carrier support member 140, and a connection part 150. The suspension apparatus may further include a shock absorber 700 and a link arm 800.

A vehicle body V to be described below may refer to various structures forming the structural framework of a vehicle, such as a frame body, a subframe, and a body shell. The following describes an example in which the longitudinal direction of the vehicle body V refers to a direction parallel to the direction of travel of a wheel W based on FIG. 12 and the width direction of the vehicle body V refers to a direction parallel to the central axis of two wheels W based on FIG. 12.

The wheel W to be described below may refer to a rear wheel of the vehicle. The central axis of the wheel W may be disposed in parallel to the width direction of the vehicle body V.

The carrier 100 may be connected to the wheel W rotatably installed on a lower side of the vehicle body V. The carrier 100 may serve as a configuration of providing the mechanical connection of various suspension components such as the spring 200 and the torsion beam axle 300 to be described below between the vehicle body V and the wheel W.

The carrier 100 may be provided as a pair. A pair of carriers 100 may be individually connected to a pair of wheels W disposed to face each other along the width direction of the vehicle body V.

The carrier 100 may include a first carrier body 110 and a second carrier body 120.

The first carrier body 110 may form the external appearance of one side of the carrier 100 and may rotatably support the wheel W. The first carrier body 110 may be disposed to face the wheel W along the width direction of the vehicle body V. The first carrier body 110 may be spaced apart from an inner surface of the wheel W by a predetermined distance along the width direction of the vehicle body V. The inner surface of the wheel W may refer to a surface where a pair of wheels W spaced apart along the width direction of the vehicle body V face each other.

The first carrier body 110 may be connected to the wheel W by a wheel bearing. The first carrier body 110 may rotatably support the wheel W around the central axis C of the wheel W. The specific shape of the first carrier body 110 is not limited to the shape illustrated in FIGS. 12 to 15, and the first carrier body 110 may be designed to have various shapes.

The carrier 100 may include a first carrier body hole 111 provided as a hole penetrating the first carrier body 110. A connection part 150 to be described below may be disposed in the first carrier body hole 111, and the carrier 100 and the carrier support member 140 may be connected through the connection part 150. A bush may be disposed inside the first carrier body hole 111.

The second carrier body 120 forms the external appearance of the other side of the carrier 100 and may support the spring 200 to be described below. The second carrier body 120 may extend from the first carrier body 110. In accordance with another embodiment, the second carrier body 120 may extend to protrude from the first carrier body 110. The following describes an example in which a direction in which the second carrier body 120 protrudes from the first carrier body 110 is a direction is parallel to the width direction of the vehicle body V, that is, a direction from the first carrier body 110 toward the center of the vehicle body V. However, the protruding direction of the second carrier body 120 is not limited thereto and may also be a direction inclined at a predetermined angle with respect to the width direction of the vehicle body V. The specific shape of the second carrier body 120 is not limited to the shape illustrated in FIGS. 13 to 15, and the second carrier body 120 may be designed to have various shapes.

The second carrier body 120 may include a seating groove 121 in which a spring 200 to be described below is seated. An elastic force generated in the spring 200 supporting the vehicle body V may be transmitted to the ground through the second carrier body 120, the first carrier body 110, and the wheel W.

The seating groove 121 may be formed to have a groove shape that is concavely recessed downward from an upper surface of the second carrier body 120. The seating groove 121 may be disposed at an end of the second carrier body 120. The seating groove 121 may have an approximately circular cross-section.

A spring fixing member 1211 may be disposed in the seating groove 121. The spring fixing member 1211 may be fixed to the seating groove 121. A part of the spring fixing member 1211 may be inserted into the spring 200 to substantially prevent the spring 200 from being detached from the carrier 100.

A carrier link arm connection member 122 may be disposed in the second carrier body 120. The carrier 100 and the link arm 800 may be connected through the carrier link arm connection member 122. The carrier 100 and the link arm 800 may be bolted together. In accordance with further another embodiment, a bolt penetrating the carrier link arm connection member 122 and the link arm 800 may be disposed to connect the carrier 100 and the link arm 800.

A carrier shock absorber connection member 123 may be disposed on the second carrier body 120. The carrier 100 and the shock absorber 700 may be connected through the carrier shock absorber connection member 123. The carrier 100 and the shock absorber 700 may be bolted together. In accordance with further another embodiment, a bolt penetrating the carrier shock absorber connection member 123 and the shock absorber 700 may be disposed to connect the carrier 100 and the shock absorber 700.

The spring 200 may be disposed between the carrier 100 and the vehicle body V. The spring 200 may be elastically deformable. The spring 200 may serve as a configuration of generating a load in a direction opposite to the movement of the wheel W by elastic deformation when the wheel W bumps, thereby maintaining the grounding state of the wheel W and absorbing shock input from the road surface.

The spring 200 may be formed to have a shape of a coil spring that is stretchable in the longitudinal direction. A lower part of the spring 200 may be inserted into the seating groove 121 and fixed to a bottom surface of the seating groove 121.

An upper part of the spring 200 may be fixed to the vehicle body V. The longitudinal direction of the spring 200 may be vertical with respect to the ground. However, the spring 200 is not limited thereto, and may also be inclined at a predetermined angle with respect to the ground within a range in which an elastic restoring force directed downward when the wheel W bumps may be generated.

The spring 200 may be substantially prevented from being detached from the carrier 100 through the spring fixing member 1211 inserted inside the spring 200.

The torsion beam axle 300 may be spaced apart from the carrier 100 and connected to the vehicle body V. The torsion beam axle 300 may be connected to the carrier 100 via the first carrier body 110, the carrier support member 140, and the connection part 150 to be described below.

The torsion beam axle 300 can include a torsion bar 310 and a trailing arm 320.

The torsion bar 310 forms the external appearance of a central part the torsion beam axle 300 and may be arranged apart from the carrier 100. The torsion bar 310 may serve as a configuration of absorbing deformation occurring in the vehicle body V during traveling of the vehicle through its own torsional deformation and improving roll stiffness when the vehicle is turning, thereby securing turning stability.

The torsion bar 310 may be formed to have a shape of a bar disposed in parallel to the width direction of the vehicle body V. A length of the torsion bar 310 may be smaller than a gap between the pair of wheels W.

The torsion bar 310 may be disposed behind the central axis C of the wheel W. That is, the torsion bar 310 may be disposed at a position spaced rearward from the central axis C of the wheel W by a predetermined distance along the longitudinal direction of the vehicle body V. Accordingly, the torsion bar 310 may further improve the packaging efficiency of a battery (not illustrated) by expanding a space where the battery is installed below the vehicle body V. The specific shape of the torsion bar 310 is not limited to the shape illustrated in FIGS. 12 to 15, and the torsion bar 310 may be designed to have various shapes.

The trailing arm 320 may be connected to the torsion bar 310 and may support the torsion bar 310 with respect to the vehicle body V. The trailing arm 320 may be connected to an end of the torsion bar 310. The trailing arm 320 may be fixed to the end of the torsion bar 310 by various types of coupling methods such as welding or bolting. The end of the trailing arm 320 may be extended rearward from the torsion bar 310 and connected to the vehicle body V.

The end of the trailing arm 320 may be rotatably connected to the vehicle body V to absorb displacement occurring when the wheel W bumps or rebounds. For example, the end of the trailing arm 320 may be rotatably connected to the vehicle body V by a bush, a bearing, a ball joint, or the like.

A trailing arm hole 321 may be provided as a hole penetrating the end of the trailing arm 320. A trailing arm bush 322 may be disposed inside the trailing arm hole 321. As a bolt is inserted into the trailing arm bush 322 and connected to the vehicle body V, the end of the trailing arm 320 may be fixed to the vehicle body V.

The trailing arm 320 may be provided as a pair. The pair of trailing arms 320 may be spaced apart from each other along the width direction of the vehicle body V. The pair of trailing arms 320 may be connected to both ends of the torsion bar 310, respectively.

The first carrier body 110 may extend from the carrier 100. The first carrier body 110 may serve as a configuration of providing a connection structure between the connection part 150 to be described below and the carrier 100.

The first carrier body 110 may be formed to have a shape of a cantilever extending upward from the first carrier body 110. The first carrier body 110 may be disposed between the wheel W and the spring 200.

The carrier support member 140 may extend from the torsion beam axle 300 and may be disposed to face the first carrier body 110. The carrier support member 140 may serve as a configuration of providing a connection structure between the connection part 150 to be described below and the torsion beam axle 300.

The carrier support member 140 may include a first carrier support member 1410 and a second carrier support member 1420 extending from the trailing arm 320.

Each of the first carrier support member 1410 and the second carrier support member 1420 may be formed to have a shape of a cantilever extending from the trailing arm 320. Accordingly, the first carrier support member 1410 and the second carrier support member 1420 may be spaced apart from each other. The first carrier body 110 may be disposed between the first carrier support member 1410 and the second carrier support member 1420. The first carrier support member 1410, the second carrier support member 1420, and the first carrier body 110 may be connected to one another by the connection part 150.

The first carrier body 110 and the carrier support member 140 may be spaced apart from each other by a predetermined distance along one direction. The carrier support member 140 may be disposed between the wheel W and the spring 200, more specifically, between the first carrier body 110 and the spring 200.

The connection part 150 may be provided between the first carrier body 110 and the carrier support member 140. The connection part 150 may serve as a configuration of connecting the first carrier body 110 and the carrier support member 140 to each other and offsetting a moment generated between the first carrier body 110 and the carrier support member 140 when the wheel W bumps.

The first carrier support member 1410 may include a first carrier hole 1411 in which a first carrier bush 1412 is disposed. The second carrier support member 1420 may include a second carrier hole 1421 in which a second carrier bush 1422 is disposed. A central axis of the first carrier hole 1411 may be disposed to be coaxial with a central axis of the second carrier hole 1421.

The suspension apparatus may further include the shock absorber 700 and the link arm 800.

The shock absorber 700 may be connected to the carrier 100 to attenuate the magnitude of vibration or shock transmitted from the road surface to the wheel W. The shock absorber 700 in accordance with the present embodiment may be exemplified by various types of shock absorbers 700 that are filled with gas, oil, or the like and may generate a damping force by an expansion motion. A lower part of the shock absorber 700 may be connected to the first carrier body 110 or the second carrier body 120 by a ball joint, a bush, or the like. In accordance with further another embodiment, the lower part of the shock absorber 700 may be connected to the second carrier body 120. An upper part of the shock absorber 700 may be connected to the vehicle body V by a ball joint, a bush, or the like.

The link arm 800 may be connected to the carrier 100 and may support the carrier 100 with respect to the vehicle body V. The link arm 800 may serve as a configuration of providing an additional support force to the carrier 100 separately from the trailing arm 320.

The link arm 800 may be formed to have shapes of various types of suspension links. A lower part of the link arm 800 may be connected to the first carrier body 110 or the second carrier body 120 by a ball joint, a bush, or the like. The upper part of the link arm 800 may be connected to the vehicle body V by a ball joint, a bush, etc. An upper part of the link arm 800 may be placed in front of the central axis of the wheel W. That is, the trailing arm 320 and the link arm 800 may be spaced back and forth along the longitudinal direction of the vehicle body V based on the central axis of the wheel W.

The link arm 800 may limit a path along which the carrier 100 moves. In addition, the torsion beam axle 300 may limit the path along which the carrier 100 moves. In this way, the movement path of the carrier 100 may be limited by the torsion beam axle 300 and the link arm 800, and the carrier 100 may be supported by the vehicle body V via the torsion beam axle 300 and/or the link arm 800.

The shock transmitted to the carrier 100 may be reduced by the shock absorber 700.

Figure 16:
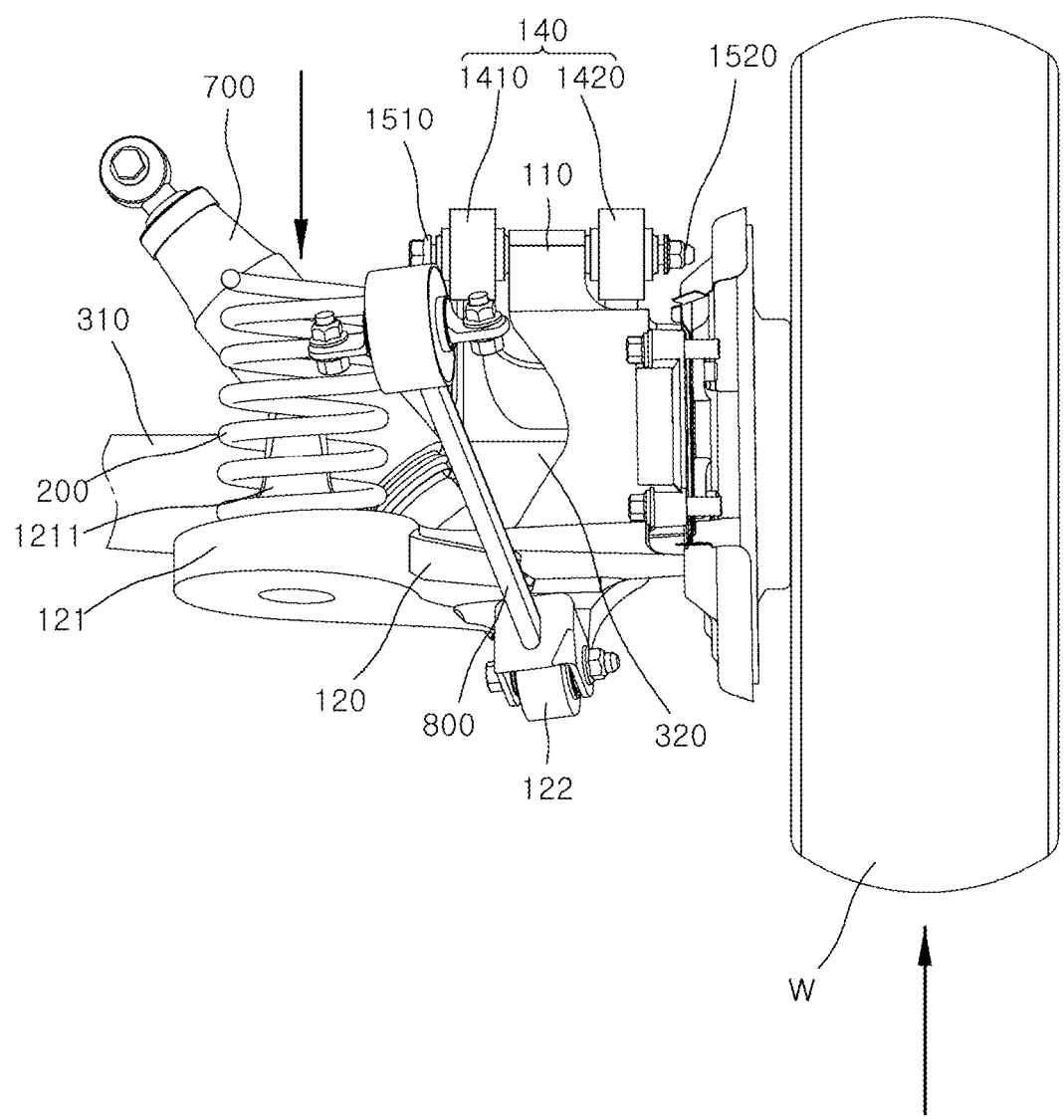
FIG. 16 is a diagram schematically illustrating the operation process of the suspension apparatus in accordance with further another embodiment of the present disclosure.
Figure 17:
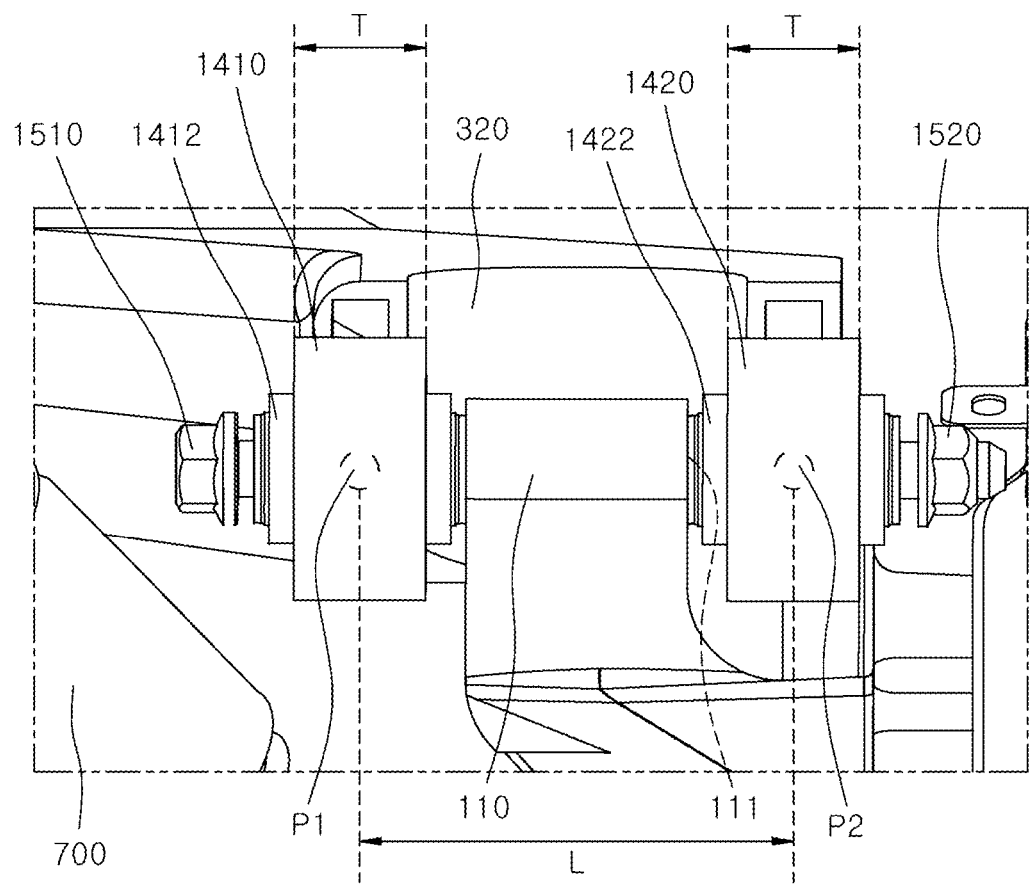
FIG. 17 is a front view of a first carrier body and a carrier support member of the suspension apparatus in accordance with further another embodiment of the present disclosure.
Figure 18:
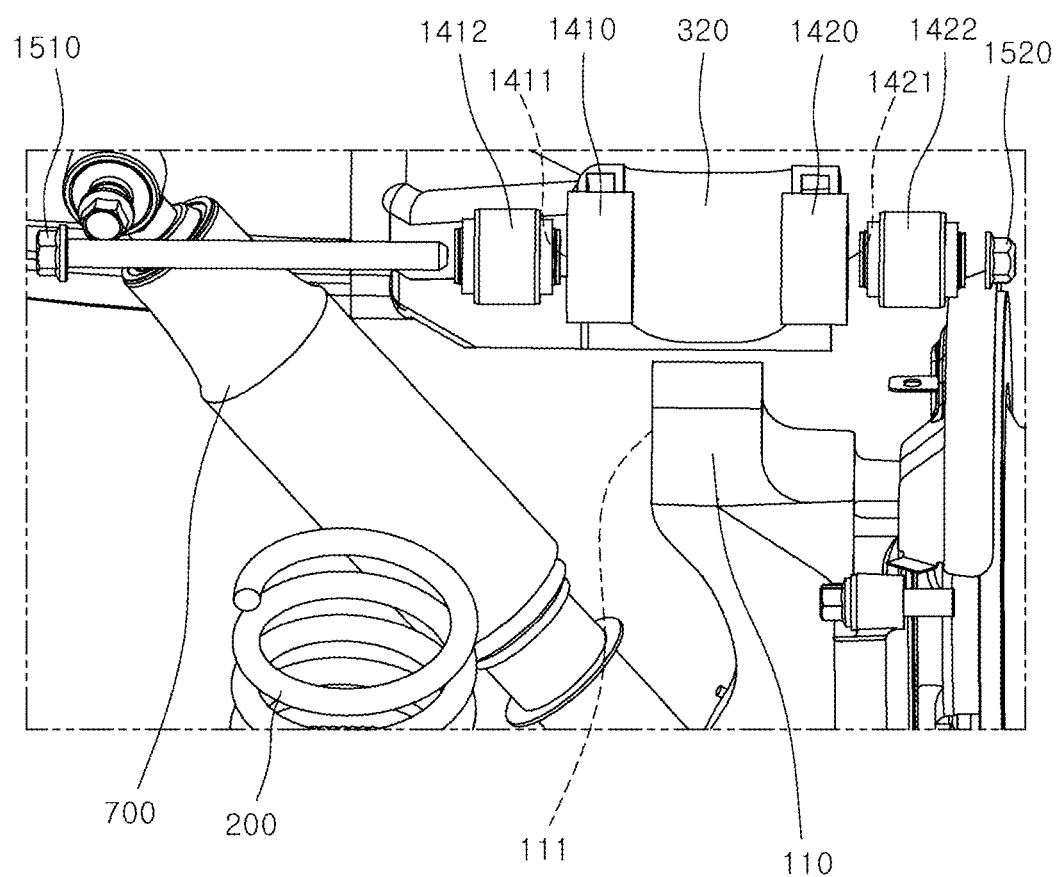
FIG. 18 is an exploded front view of the first carrier body and the carrier support member of the suspension apparatus in accordance with further another embodiment of the present disclosure.
Figure 19:
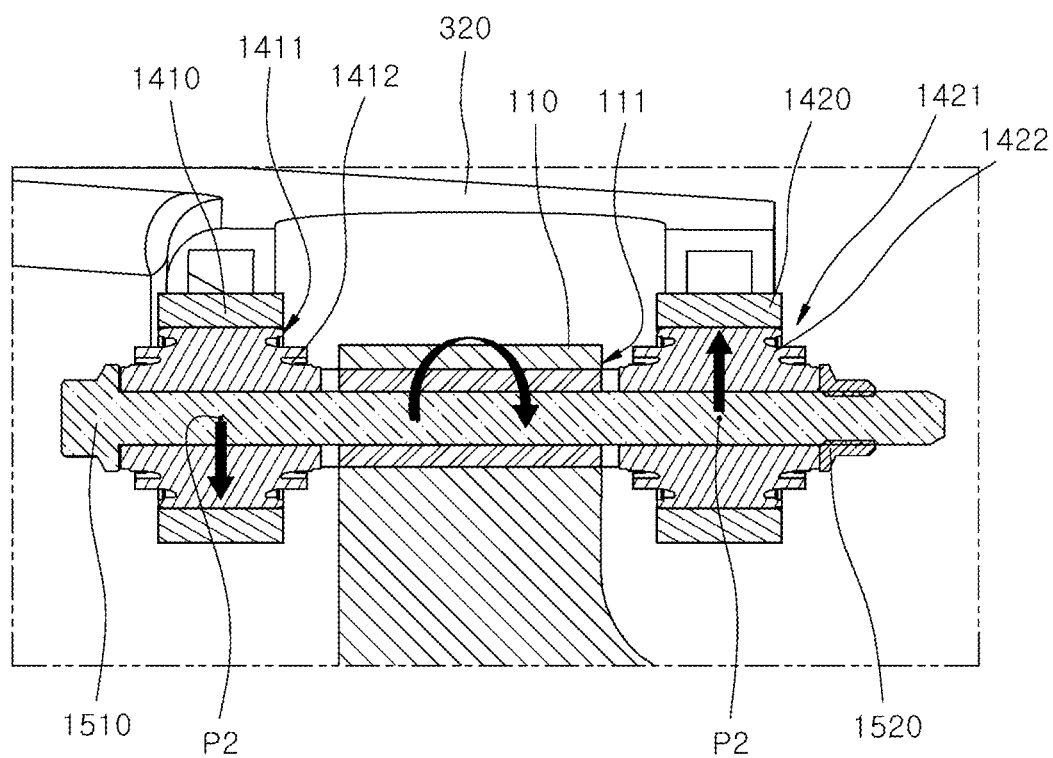
FIGS. 19 and 20 are diagrams schematically illustrating the operation process of the first carrier body and the carrier support member of the suspension apparatus in accordance with further another embodiment of the present disclosure.
Figure 20:
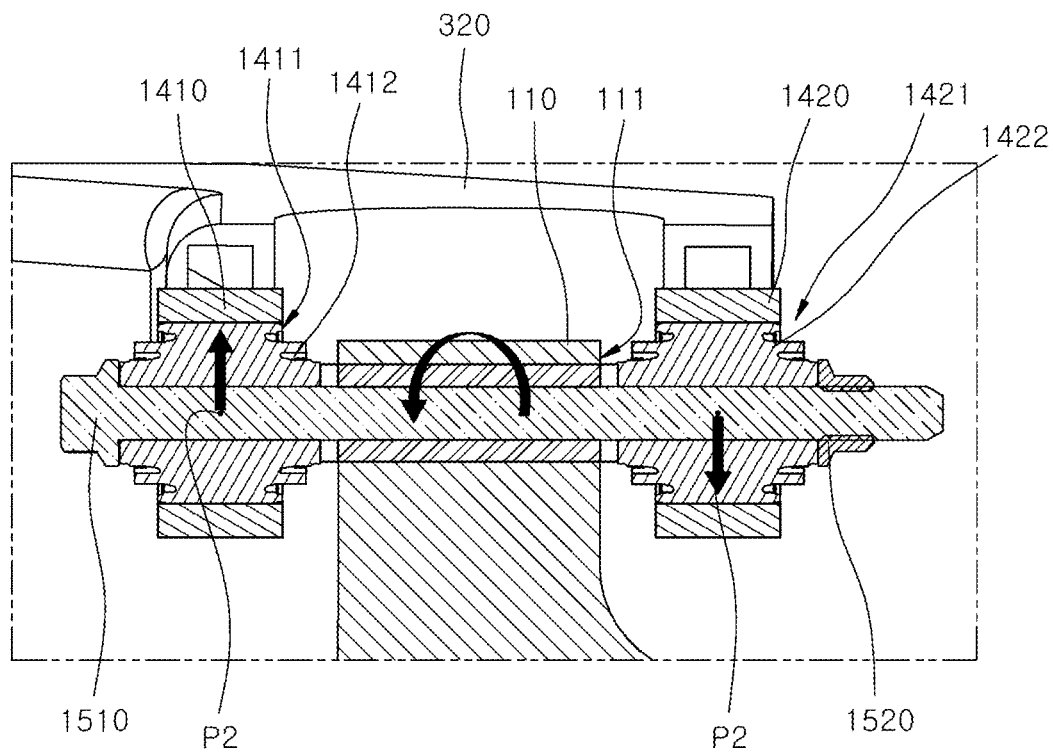

FIG. 16 is a diagram schematically illustrating the operation process of the suspension apparatus in accordance with further another embodiment of the present disclosure, FIG. 17 is a front view of a first carrier body and a carrier support member of the suspension apparatus in accordance with further another embodiment of the present disclosure, FIG. 18 is an exploded front view of the first carrier body and the carrier support member of the suspension apparatus in accordance with further another embodiment of the present disclosure, and FIGS. 19 and 20 are diagrams schematically illustrating the operation process of the first carrier body and the carrier support member of the suspension apparatus in accordance with further another embodiment of the present disclosure.

Referring to FIGS. 16 to 20, while the vehicle is traveling, a load directed upward from the road surface may be applied to the wheel W and the first carrier body 110 due to unevenness or the like of the road surface.

Due to such a load, the spring 200 may be compressed in the longitudinal direction and may apply an elastic force to the second carrier body 120 in the direction toward the road surface.

As a load applied to the first carrier body 110 through the wheel W and a load applied to the second carrier body 120 by the spring 200 act in opposite directions, a rotational force is generated in the carrier 100 centered on a direction intersecting the first direction.

As such a rotational force is transmitted to a connector 1510 through the first carrier support member 1410 and the second carrier support member 1420, and as the first carrier support member 1410, the second carrier support member 1420, and the first carrier body 110 are integrally connected to the connector 1510, a moment is generated in the first carrier body 110 to rotate with respect to the first carrier support member 1410 and the second carrier support member 1420.

Referring to FIG. 19, the first carrier bush 1412 and the second carrier bush 1422 are elastically deformed by a moment applied by the connector 1510. More specifically, the first carrier bush 1412 applies a load directed downward toward the road surface to the first carrier support member 1410, and the second carrier bush 1422 applies a load directed upward from the road surface to the second carrier support member 1420.

Referring to FIG. 20, the first carrier bush 1412 and the second carrier bush 1422 are elastically deformed by a moment applied by the connector 1510. More specifically, the first carrier bush 1412 applies a load directed upward from the road surface to the first carrier support member 1410, and the second carrier bush 1422 applies a load directed downward toward the road surface to the second carrier support member 1420.

Due to the elastic loads of the first carrier bush 1412 and the second carrier bush 1422, a reaction moment is generated in the first carrier body 110 to offset the moment generated by the wheel W and the spring 200, and the rotation of the carrier 100 may be substantially prevented.

The connection part 150 may include a connector 1510 and a pressing member 1520.

The connector 1510 may penetrate the first carrier body 110. In accordance with further another embodiment, the connector 1510 may penetrate the first carrier body hole 111 disposed in the first carrier body 110. In accordance with further another embodiment, the connector 1510 may penetrate a bush disposed inside the first carrier body hole 111.

The connector 1510 may penetrate the first carrier support member 1410 and the second carrier support member 1420. In accordance with further another embodiment, the connector 1510 may penetrate the first carrier support member 1410, the first carrier body 110, and the second carrier support member 1420. The connector 1510 may penetrate the first carrier bush 1412 disposed in the first carrier hole 1411 of the first carrier support member 1410, the second carrier bush 1422 disposed in the second carrier hole 1421 of the second carrier support member 1420, and the bush disposed in the first carrier body hole 111 of the first carrier body 110.

An end of the connector 1510 may be coupled to the pressing member 1520. The pressing member 1520 may be coupled at the end of the connector 1510 and move toward the other end of the connector 1510. In accordance with further another embodiment, the connector 1510 and the pressing member 1520 may be provided with a bolt and a nut.

As the connector 1510 penetrates the first carrier support member 1410, the first carrier body 110, and the second carrier support member 1420 and is fastened to the pressing member 1520, the first carrier support member 1410 and the second carrier support member 1420 may be pressed toward the first carrier body 110 by the connection part 150.

The first carrier bush 1412, the second carrier bush 1422, and the bush may be elastically deformable. The first carrier bush 1412, the second carrier bush 1422, and the bush may be elastically deformed when the wheel W bumps and may generate a reaction force that offsets a load applied to the carrier 100 from the wheel W.

The connector 1510 may serve as a moment arm that induces elastic deformation of the first carrier bush 1412 and the second carrier bush 1422 by transmitting a rotational force generated in the carrier 100 when the wheel W bumps to the first carrier bush 1412 and the second carrier bush 1422, and transmits a reaction moment generated from the first carrier bush 1412 and the second carrier bush 1422 to the carrier 100.

The longitudinal direction of the connector 1510 may be disposed in parallel to the direction in which the second carrier body 120 protrudes. Accordingly, the connector 1510 may induce the reaction moment generated by the elastic deformation of the first carrier bush 1412 and the second carrier bush 1422 when the wheel W bumps to act in a direction in which the reaction moment offsets the moment generated in the carrier 100 generated by the wheel W and the spring 200.

As the first carrier body 110 is disposed between the first carrier bush 1412 and the second carrier bush 1422, the magnitude of a load applied to the first carrier bush 1412 and the second carrier bush 1422 when the wheel W bumps may be reduced, and the durability performance of the component may be improved.

As the first carrier bush 1412 and the second carrier bush 1422 are connected to each other by the connector 1510 separated from the first carrier body 110, the thicknesses of the first carrier body 110, the first carrier support member 1410, and the second carrier support member 1420 are reduced, so that the overall weight of the product may be reduced and space utilization may be improved.

The gap between the first carrier bush 1412 and the second carrier bush 1422 may be increased compared to when the first carrier body 110 is connected to a bracket. In accordance with further another embodiment, as the first carrier body 110 is disposed between the first carrier bush 1412 and the second carrier bush 1422, a moment length L between a first action point P1 of the first carrier bush 1412 and a second action point P2 of the second carrier bush 1422 may be increased. As the moment length L increases, the magnitudes of reaction forces generated at the first action point P1 and the second action point P2 may be reduced.

As the moment length L between the first action point P1 of the first carrier bush 1412 and the second action point P2 of the second carrier bush 1422 increases and the magnitude of the reaction force generated at the first action point P1 and the second action point P2 decrease, the durability of the first carrier bush 1412 and the second carrier bush 1422 may be improved.

In addition, as the first carrier bush 1412 and the second carrier bush 1422 are disposed on the first carrier support member 1410 and the second carrier support member 1420 instead of the first carrier body 110, the volume of the first carrier body 110 may be reduced.

Moreover, as the first carrier bush 1412 and the second carrier bush 1422 are disposed on the first carrier support member 1410 and the second carrier support member 1420, a bush pipe for accommodating the first carrier bush 1412 and the second carrier bush 1422 may be welded to the first carrier support member 1410 and the second carrier support member 1420, so that the formability of the first carrier support member 1410 and the second carrier support member 1420 may be improved.

In addition, since the volume of the first carrier support member 1410 and the second carrier support member 1420 is reduced, the weight of the carrier 100 may be reduced and the cost may be reduced.

Referring to FIG. 19, when the carrier 100 rotates clockwise, the connector 1510 connected to the first carrier body 110 of the carrier 100 also rotates clockwise, and a reaction force may be generated on the first carrier bush 1412 and the second carrier bush 1422 connected to the connector 1510.

The first carrier bush 1412 generates a reaction force in a direction toward the ground, and the second carrier bush 1422 generates a reaction force in a direction from the ground. Accordingly, a moment acting on the connector 1510 may be offset.

Referring to FIG. 20, when the carrier 100 rotates counterclockwise, the connector 1510 connected to the first carrier body 110 of the carrier 100 also rotates counterclockwise, and a reaction force may be generated on the first carrier bush 1412 and the second carrier bush 1422 connected to the connector 1510.

The first carrier bush 1412 generates a reaction force in the direction from the ground, and the second carrier bush 1422 generates a reaction force in the direction toward the ground. Accordingly, a moment acting on the connector 1510 may be offset.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A suspension apparatus comprising:
   a carrier connected to a wheel;
   a spring mounted between the carrier and a vehicle body;
   a torsion beam axle spaced apart from the carrier and connected to the vehicle body;
   a first support member extending from the carrier;
   a second support member extending from the torsion beam axle and disposed to face the first support member; and
   a connection member disposed between the first support member and the second support member and connecting the first support member and the second support member to each other,
   wherein the connection member includes:
   a first bush connected to the first support member;
   a second bush connected to the second support member and disposed to face the first bush; and
   a pipe disposed between the first bush and the second bush and including first and second ends connected to the first bush and the second bush, respectively, and
   wherein the pipe includes:
   a first pipe extending from the first bush; and a second pipe extending from the second bush and connected to the first pipe to be reciprocally movable in a direction parallel to the first direction.

2. The suspension apparatus of claim 1, wherein the carrier includes:
   a first carrier body disposed to face the wheel and rotatably supporting the wheel; and
   a second carrier body extending from the first carrier body in a first direction and supporting the spring.

3. The suspension apparatus of claim 2, wherein the torsion beam axle includes:
   a torsion bar disposed in parallel to a width direction of the vehicle body; and
   a trailing arm connected to the torsion bar and supporting the torsion bar with respect to the vehicle body.

4. The suspension apparatus of claim 3, wherein the torsion bar is disposed behind a central axis of the wheel.

5. The suspension apparatus of claim 1, wherein the first bush and the second bush are elastically deformable.

6. The suspension apparatus of claim 5, wherein the pipe is disposed in parallel to the first direction.

7. The suspension apparatus of claim 1, wherein the second pipe is rotatably connected to the first pipe centered on the first direction, and reciprocally moves in the direction parallel to the first direction according to a rotational direction.

8. The suspension apparatus of claim 1, wherein the connection member further includes:
   a fastening rod penetrating the first bush, the pipe, and the second bush;
   a first pressing member connected to a first end of the fastening rod and pressing the first bush toward the second bush; and
   a second pressing member connected to a second end of the fastening rod and pressing the second bush toward the first bush.

9. A suspension apparatus comprising:
   a carrier connected to a wheel;
   a spring mounted between the carrier and a vehicle body;
   a torsion beam axle spaced apart from the carrier and connected to the vehicle body;
   a carrier support member extending from the torsion beam axle and including a first carrier support member and a second carrier support member spaced apart from the first carrier support member; and
   a connection part connecting the carrier, the first carrier support member, and the second carrier support member to one another,
   wherein the carrier includes a first carrier body connected to the wheel,
   wherein the carrier support member includes:
      a first carrier hole penetrating the first carrier support member;
      a first carrier bush mounted in the first carrier hole;
      a second carrier hole penetrating the second carrier support member; and
      a second carrier bush mounted in the second carrier hole,
   wherein the connection part includes:
      a connector connecting the first carrier bush, the second carrier bush, and the first carrier body to one another; and
      a pressing member fastened to the connector and pressing the first carrier bush and the second carrier bush toward the first carrier body.

10. The suspension apparatus of claim 9, wherein the carrier further includes:
    a second carrier body extending from the first carrier body and supporting the spring.

11. The suspension apparatus of claim 10, wherein the torsion beam axle includes:
    a torsion bar disposed in parallel to a width direction of the vehicle body; and
    a trailing arm connected to the torsion bar and supporting the torsion bar with respect to the vehicle body, the second support member extending from the training arm.

12. The suspension apparatus of claim 11, wherein the torsion bar is disposed behind a central axis of the wheel.

13. The suspension apparatus of claim 10,
    wherein the carrier includes a carrier shock absorber connection member disposed on the second carrier body, and
    wherein the suspension apparatus further includes a shock absorber connected to the carrier shock absorber connection member and the vehicle body to attenuate shock transmitted from the wheel.

14. The suspension apparatus of claim 10,
    wherein the carrier includes a carrier link arm connection member disposed on the second carrier body, and
    wherein the suspension apparatus further includes a link arm connected to the carrier link arm connection member and the vehicle body to limit a movement path of the carrier.

15. The suspension apparatus of claim 9, wherein the first carrier body is disposed between the first carrier bush and the second carrier bush.

16. The suspension apparatus of claim 9, wherein the first carrier bush and the second carrier bush are elastically deformable.

* * * * *